US012352385B2

United States Patent
Szmoleniczki et al.

(10) Patent No.: US 12,352,385 B2
(45) Date of Patent: Jul. 8, 2025

(54) SUPPORT STRUCTURE

(71) Applicant: Wellis Magyarorszag Zrt., Budapest (HU)

(72) Inventors: Arpad Szmoleniczki, Kiskunlachaza (HU); Jozsef Lakatos, Inarcs (HU)

(73) Assignee: Wellis Magyarorszag Zrt., Budapest (HU)

( * ) Notice: Subject to any disclaimer, the term of this patent is extended or adjusted under 35 U.S.C. 154(b) by 0 days.

(21) Appl. No.: 18/284,335

(22) PCT Filed: Nov. 3, 2022

(86) PCT No.: PCT/HU2022/050078
§ 371 (c)(1),
(2) Date: Sep. 27, 2023

(87) PCT Pub. No.: WO2023/079321
PCT Pub. Date: May 11, 2023

(65) Prior Publication Data
US 2024/0159349 A1   May 16, 2024

(30) Foreign Application Priority Data

Nov. 3, 2021 (HU) .................................. P2100377

(51) Int. Cl.
*F16M 5/00* (2006.01)
*E04H 4/12* (2006.01)
(52) U.S. Cl.
CPC ............. *F16M 5/00* (2013.01); *E04H 4/1245* (2013.01); *F16M 2200/08* (2013.01)
(58) Field of Classification Search
CPC .... F16M 5/00; F16M 2200/08; E04H 4/1245; E04H 4/12
(Continued)

(56) References Cited

U.S. PATENT DOCUMENTS 5,488,259 A    1/1996 Cho
9,581,175 B2 *  2/2017 Nelson ..................... F16M 5/00
(Continued)

FOREIGN PATENT DOCUMENTS

WO    2019201413    10/2019

OTHER PUBLICATIONS

European Patent Office, International Search Report (4 pgs.), Written Opinion of the International Searching Authority (6 pgs.), mailing date Mar. 20, 2023.

*Primary Examiner* — Nkeisha Smith
(74) *Attorney, Agent, or Firm* — Wood Herron & Evans LLP

(57) ABSTRACT

The invention is a support structure comprising
a first support member portion (10), and
a second support member portion (20) adapted to be fixed to the first support member portion (10) in various relative positions with respect to the first support member portion (10) along a slide direction.
The support structure is characterised in that
the first support member portion (10) comprises
a base plate (15),
a sliding edge (17) protruding from the base plate (15) and defining a slide surface, and
a tab (11) arranged spaced apart from the slide surface of the sliding edge (17), said tab (11) defining a groove (35) adapted for receiving an edge (34) of the second support member portion (20) extending along the slide direction, and
the second support member portion (20) comprises a cut-out (23) on the edge (34) of the second support member portion (20) extending along the slide direction adapted to enable the second support member (Continued)

portion (20) to be placed on the slide surface of the first support member portion (10).

8 Claims, 11 Drawing Sheets

(58) Field of Classification Search
USPC .................................................. 248/346.01
See application file for complete search history.

(56) References Cited

U.S. PATENT DOCUMENTS

| 9,973,056 B2* | 5/2018 | Copanas | .................. | H02K 5/26 |
| 2005/0098374 A1* | 5/2005 | Moon | ....................... | F16F 1/54 |
| | | | | 180/312 |

* cited by examiner

SUPPORT STRUCTURE

This application claims priority, under Section 371, and/or as a continuation under Section 120, to PCT Application No. PCT/HU2022/050078, filed on Nov. 3, 2022, which claims priority to Hungary Application No. P2100377, filed on Nov. 3, 2021, each of which is expressly incorporated by reference herein, in its entirety.

TECHNICAL FIELD

The invention relates to a support structure that is preferably adapted for fixing a mountable component, particularly a motor or a pump.

BACKGROUND ART

Whirlpool tubs and massage pools usually comprise a pump driven by a motor, for example an electric motor, for a continuous circulation of water in the tub or pool, wherein the pump or its motor is fixed—typically inside an external housing of the tub or pool—to the structural components of the tub or pool, or to a frame or framework ensuring the stability of the tub or pool. Due to this arrangement, the maintenance or replacement of the motor or pump usually necessitates stripping or removal of the external housing of the tub or pool such that the motor or pump can be accessed. In many cases it is only possible to remove the pump after draining the water from the tub or pool, which—especially in the case of pools—increases downtime and costs.

In the case of current, commercially available solutions the pumps of whirlpool tubs or pools are arranged on an insulation layer formed on a base plate, and the pump is positioned corresponding to the arrangement of the water pipes. The pump is typically attached to the base plate via rubber brackets; holes for the rubber brackets must typically be cut-out (blanked out) from the insulation layer post-fabrication. It is a disadvantage that the insulation blocks the view the of ribs or recesses possibly arranged on the base plate that limit the placement of the pump. If due to the surface configuration of the base plate it is not feasible to attach the pump in a particular position, the pump must be relocated, i.e., new cut-outs must be made in the insulation layer. The base plate is typically bored through at the attachment locations, and the pump is secured to the base plate from the bottom, for example by applying nuts. In the case of certain types of pools, the nuts securing the pump can only be accessed after draining the water from the pool.

There are further apparatuses for securing or retaining pumps or motors known in the art. U.S. Pat. No. 2,498,392 discloses a device for retaining a motor comprising a bottom tray-like member (denoted by reference numeral 11) and a cover plate (denoted by reference numeral 16), wherein the cover plate is slidable in a longitudinal direction with respect to the bottom member. The amount to which the bottom member is slidable relative to the cover plate can be adjusted by a threaded stem. The cover plate comprises pairs of elongated holes for retaining motors with different dimensions.

U.S. Pat. No. 2,765,997 also discloses a device for retaining a motor that also has two portions: a main support portion (base member) and a sliding portion (slide). The sliding portion is disposed under the base member and can be fixed at any longitudinal position by means of nuts denoted by reference numeral 12. As with U.S. Pat. No. 2,498,392, the slide can be moved by applying a screw or a threaded stem.

US 2010/0019121 A1 discloses a mount base for pool pumps that also enables height adjustment of the pump's position. The mount base comprises mounting holes wherein a pump can be secured by applying bolts or other retainers. Due to the vertical adjustability, the mount base can be applied with pumps of various dimensions and types. The mount base can be made of various materials, for example plastic, ceramics, or rubber.

US 2011/0017900 A1 discloses a support structure (mounting bracket) for retaining a pump, comprising at least one fixed and at least one movable hook. The mounting bracket and the pump attached to it are movable and relocatable, for example slidable along a track or rail. The track or rail along which the mounting bracket is movable comprises a back-folded edge adapted for guiding and retaining the mounting bracket.

CN 209786906 U also discloses a device for retaining a motor in various positions, comprising a plurality of portions that can be fixed to each other and are slidable relative to each other.

DESCRIPTION OF THE INVENTION

In light of the known technical solutions there is a need for a support structure that can be assembled and dismounted easily with a small space requirement and is able to stably retain the mounted components used with pools or tubs, for example motors or pumps.

The object of the technical solution according to the invention is to provide a support structure that eliminates the drawbacks of prior art solutions to the greatest possible extent.

The primary object of the invention is to provide a support structure that can be assembled and dismounted easily, wherein the assembly and dismounting operations require a small space such that the mounted components applied in the case of pools or tubs, for example pumps, can be installed easily, even in small and confined spaces.

Another object of the invention is to provide a support structure that is able to retain a mountable component with as high a mass as 20 kg in a stable and prolonged manner, even at a rotated or even vertical position of the support structure.

The objects according to the invention have been achieved by providing the support structure according to claim 1. Preferred embodiments of the invention are defined in the dependent claims.

An advantage of the technical solution according to the invention is that it has a small space requirement, and that the support structure according to the invention can be assembled and dismounted in confined spaces, and thus the support structure according to the invention does not unnecessarily take up valuable, utilizable space.

Another advantage of the invention is that the apparatus has a simple configuration and can be installed and maintained easily.

BRIEF DESCRIPTION OF THE DRAWINGS

Preferred embodiments of the invention are described below by way of example with reference to the following drawings, where.

MODES FOR CARRYING OUT THE INVENTION

Figure 1:
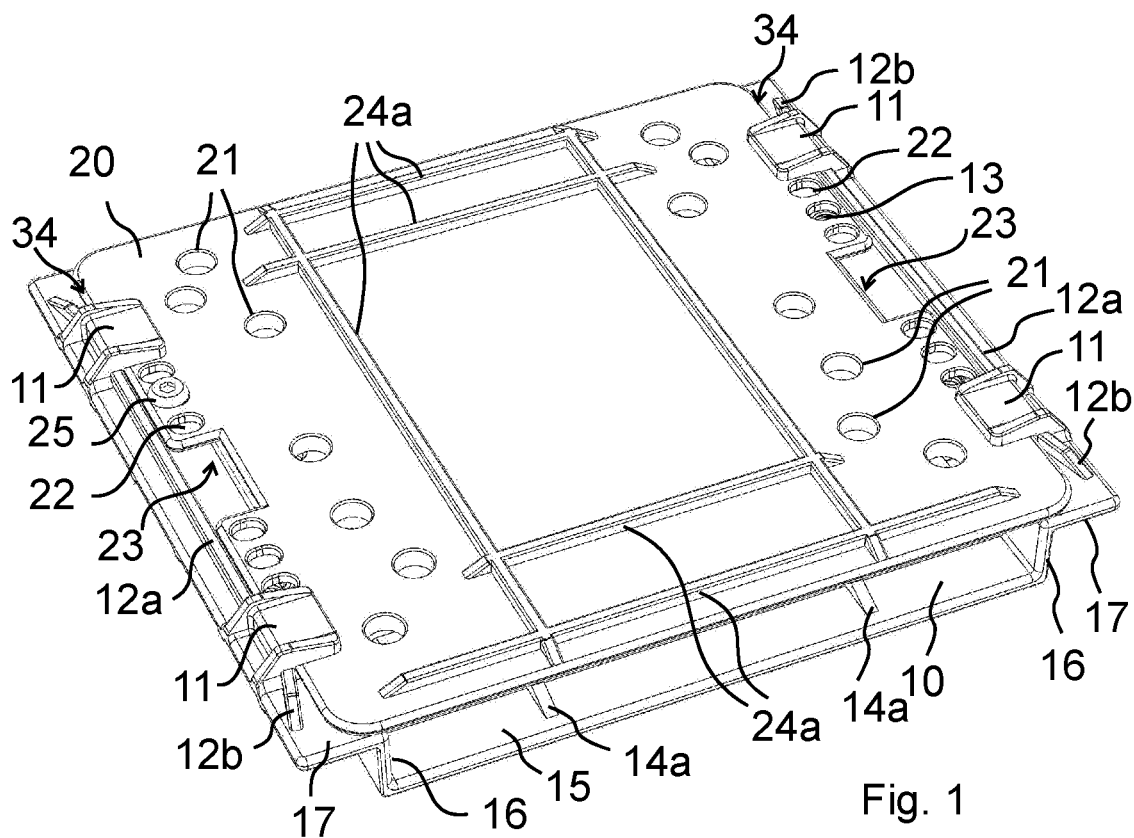
FIG. 1 is a perspective view of a preferred embodiment of the support structure according to the invention in an assembled state.

FIG. 1 shows a perspective view of a preferred embodiment of the support structure according to the invention in an assembled state. The support structure according to the invention comprises a first support member portion 10 and a second support member portion 20 that is adapted to be fixed to the first support member portion 10 in various relative positions along a slide direction. The details of the preferred configuration of the first support member portion 10 and the second support member portion 20 are described below in relation to FIGS. 20-24 and FIGS. 14-19, respectively. The most important features of the components will now be described also in relation to FIG. 1.

The first support member portion 10 of the support structure according to the invention comprises a base plate 15 and a sliding edge 17 protruding from the base plate 15 and defining a slide surface. The second support member portion 20 is preferably slidable with respect to the first support member portion 10 along the slide surface.

The first support member portion 10 further comprises a tab 11 arranged spaced apart from the slide surface of the sliding edge 17, wherein the tab 11 and the slide surface defines a groove 35 (see FIG. 24) adapted for receiving an edge 34 of the second support member portion 20 extending along a slide direction. The groove 35 is preferably adapted for guiding the second support member portion 20 along the slide direction.

The second support member portion 20 is preferably configured to contact the sliding edge 17 of the first support member portion 10, i.e., in the assembled state of the support structure the second support member portion 20 is preferably seated on the sliding edge 17. The second support member portion 20 further comprises a cut-out 23 on the edge 34 of the second support member portion 20 extending along the slide direction and it is adapted to enable the second support member portion 20 to be placed on the slide surface of the first support member portion 10. The size and shape of the cut-out 23 preferably corresponds to the outside dimensions of the tab 11 to enable the second support member portion 20 to be placed on the slide surface of the first support member portion 10, i.e., that the tab 11 does not hamper the second support member portion 20 from being placed on the first support member portion 10.

The support structure according to the invention is preferably made of a lightweight and strong (load bearing) material, for example plastic, more preferably a polymer material. The material of the support structure preferably has properties that provide vibration and acoustic damping, which results in that the vibrations of the mountable component (for example motor or pump) secured to the support structure are not amplified or transmitted. In case a lightweight, low-density material, for example, plastic is applied, the support structure has low a mass, which allows for moving or shipping the support structure in a more economical and environmentally friendly way.

The mounting holes 21 formed in the second support member portion 20 enable the support structure according to the invention to be applied with various mountable components of different sizes and types. The preferred ways of securing mountable components of different sizes and types to the same support structure are illustrated in FIGS. 9-13.

Figure 2:
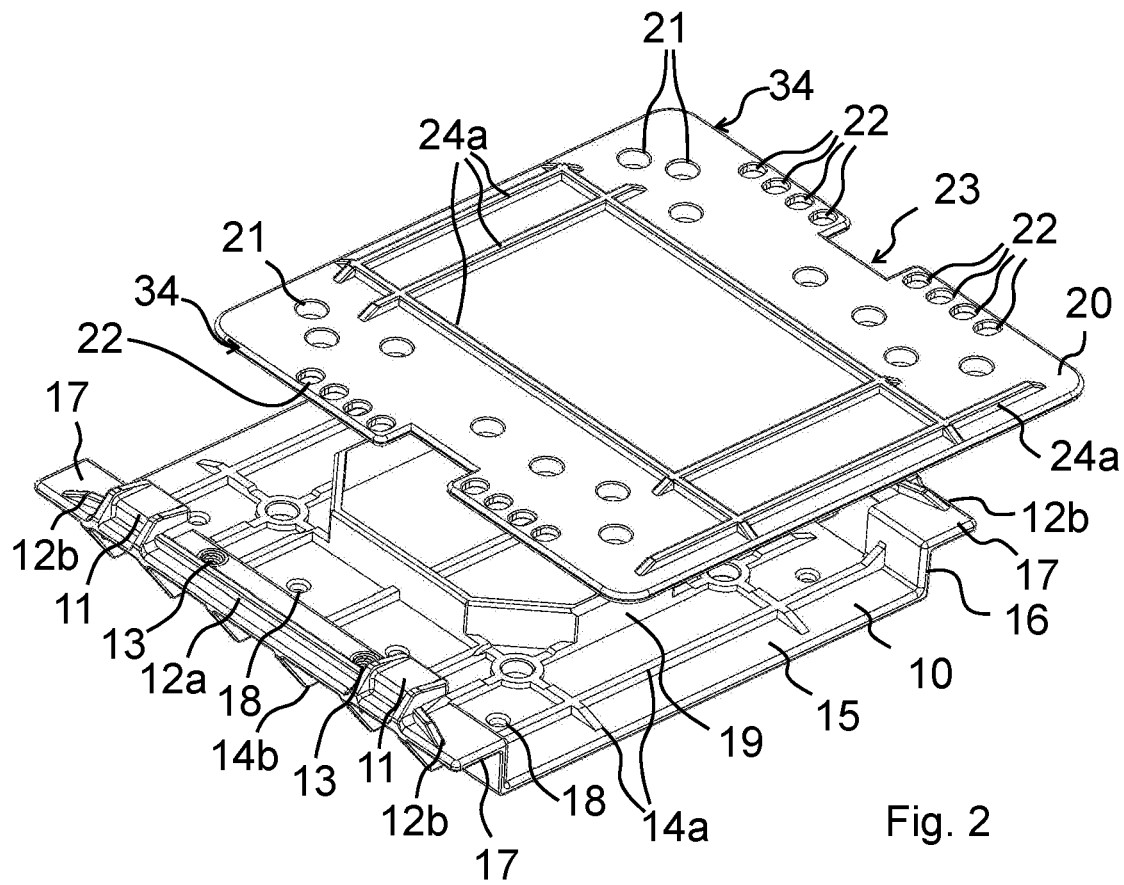
FIG. 2 is an exploded perspective view of the support structure according to FIG. 1.
Figure 3:
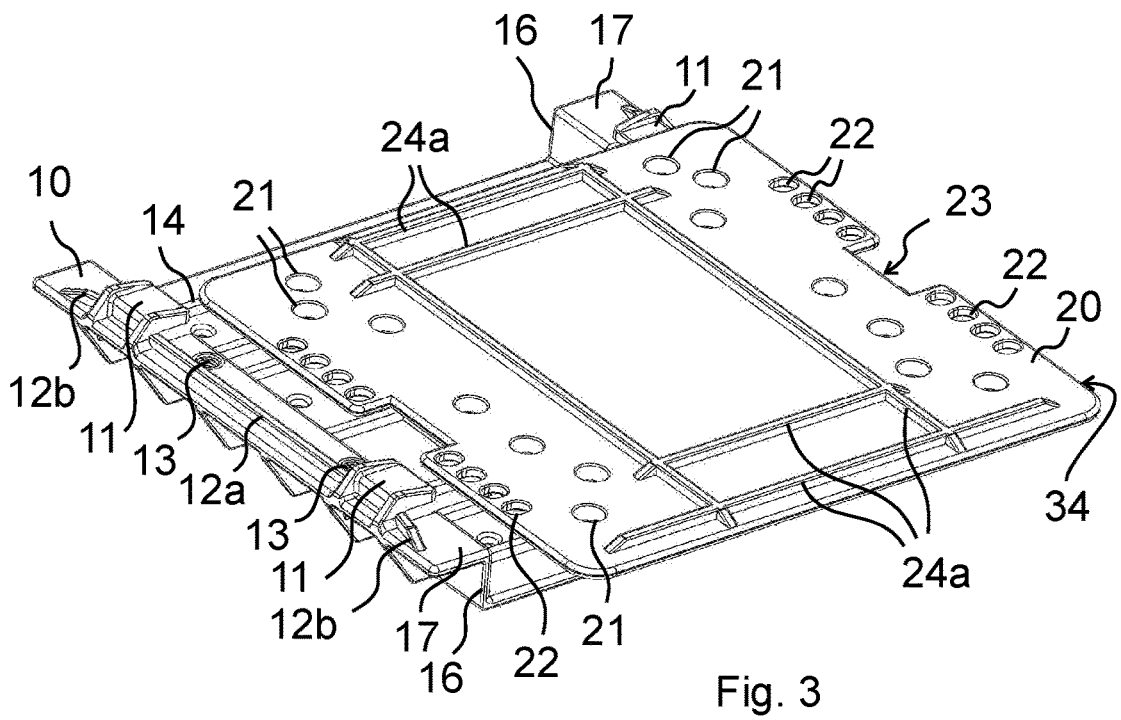
FIG. 3 is an exploded view of the support structure according to FIG. 1, FIGS. 4-6 illustrate in side view the assembly steps of the support structure according to FIG. 1.

FIGS. 2 and 3 show exploded views of the support structure according to the invention that also illustrate the preferred way of conjoining the first support member portion 10 and the second support member portion 20 of the support structure. In FIGS. 2 and 3 the support structure according to the invention is shown without a mountable component, for example a pump or motor. The illustrated way of assembling the support structure may of course be implemented in the same manner also in the case of applying a second support member portion 20 previously provided with a mountable component. In FIGS. 2-3 further structural components are also not shown to which the first support member portion 10 of the support structure could be secured.

If the first support member portion 10 of the support structure is affixed to further structural components, then the support structure can be assembled by moving the second support member portion 20. To assemble the support structure, the second support member portion 20 must be brought close to the first support member portion 10 such that the second support member portion 20 can be placed on the sliding edge 17 of the first support member portion 10. To allow a successful placement, the cut-out 23 preferably must be fitted against the tab 11 of the first support member portion 10, and thus the second support member portion 20 can be brought into contact with the slide surface of the sliding edge 17 of the first support member portion 10 by passing the tab 11 through the cut-out 23. Subsequent to that, the second support member portion 20 is slidable along the slide surface of the sliding edge 17 in the slide direction, while the second support member portion 20 is being guided by the groove 35 defined by the tab 11 and the slide surface (see FIG. 24). Guiding of the second support member portion 20 is preferably assisted by a guide member 12a extending along the slide direction. After reaching the desired position, the first support member portion 10 and the second support member portion 20 can be coupled together, preferably with a releasable connection. In the preferred embodiment according to FIGS. 2-3, the first support member portion 10 of the support structure comprises a securing bore 13 and the second support member portion 20 has a plurality of securing-positioning bores 22, the latter being adapted for securing the first support member portion 10 to the second support member portion 20 in various relative positions along a slide direction by means of a bolt 25.

In the preferred embodiment depicted in FIGS. 2-3, for guiding the second support member portion 20 the first support member portion 10 comprises two oppositely arranged tabs 11, each tab 11 defining a groove 35. The oppositely arranged grooves 35 are adapted to guide the second support member portion 20 from both sides, i.e., along both edges 34 of the second support member portion 20. Even more preferably, the first support member portion 10 comprises more than one pairs of oppositely arranged tabs 11; in the preferred embodiment according to FIGS. 2-3 the first support member portion 10 comprises two pairs of oppositely arranged tabs 11. The cut-out 23 is preferably formed on the second support member portion 20 in such a manner that in the case of applying more than one tabs 11 it can be passed around any of the tabs 11, and that the other tabs 11 also do not block the second support member portion 20 from being placed on the first support member portion 10. In case more than one tabs 11 are included, it is optionally preferable to apply more than one cut-outs 23.

Of course, if there is more room available for moving the second support member portion 20, the second support member portion 20 can be slid along the slide direction directly into the groove 35 defined by the tab 11. In such a case, the introduction of the second support member portion 20 into the groove 35 of the first support member portion 10 is preferably also assisted by an insertion guide member 12b.

The mountable component retained by the support structure according to the invention can be secured to the second support member portion 20 for example via mounting holes 21 formed in the second support member portion 20. The first support member portion 10 can be preferably secured to further structural components, preferably via component, holes 18 that are formed preferably on the first support member portion 10, more preferably on the base plate 15 of the first support member portion 10. The mountable component can also be secured to the first support member portion 10 of the support structure according to the invention, in which case the support structure can be coupled to further structural components via the second support member portion 20.

The first support member portion 10 and the second support member portion 20 preferably comprise stiffener members 14a, 14b, 24a, 24b, wherein the stiffener members 14a, 14b, 24a, 24b are preferably implemented as stiffening ribs and adapted for reinforcing and stiffening the first support member portion 10 and second support member portion 20. The stiffener members 14a, 14b, 24a, 24b are preferably extending along the slide direction and transversely thereto.

Figure 4:
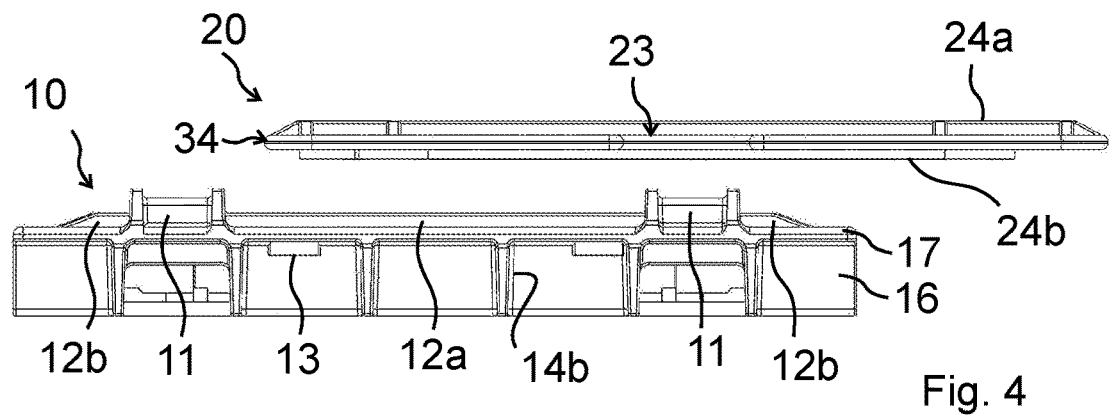
Figure 5:
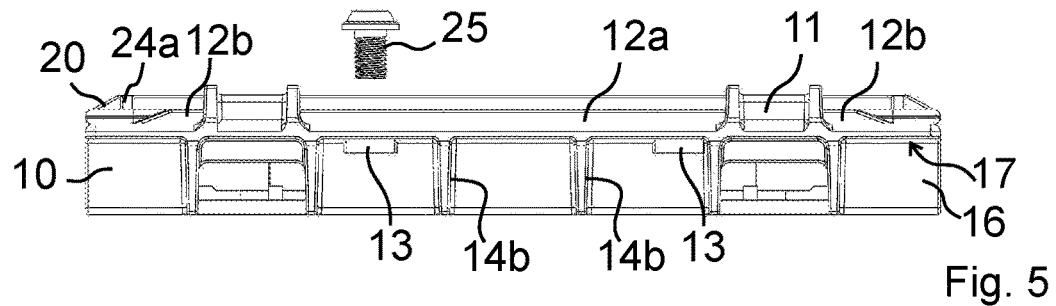
Figure 6:
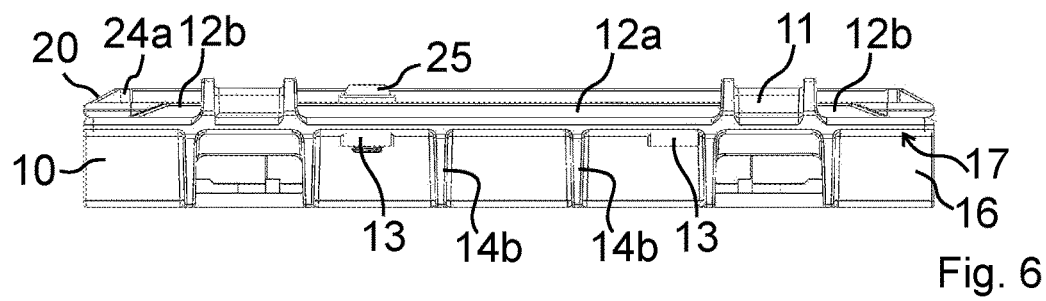

In FIGS. 4-6, assembling the support structure according to the invention is illustrated in side views in a manner similar to FIGS. 2-3. In FIGS. 4-6, the process of assembling the support structure is illustrated, wherein the support structure is arranged generally horizontally, and accordingly, in the description the terms under/above, up/down, in front of/behind are used corresponding to the arrangement shown in the figures; however, the support structure according to the invention can also be used in other rotated positions and assembled in a manner illustrated in the figures.

FIG. 4 depicts a state of the assembly process of the support structure according to the invention wherein the cut-out 23 of the second support member portion 20 is located directly above the tab 11 of the first support member portion 10, so the second support member portion 20 can be placed on the first support member portion 10 by simply lowering it thereon, which results in the second support member portion 20 being seated on the sliding edge 17 of the first support member portion 10. FIG. 4 points out an advantageous feature of support structure according to the invention, namely that conjoining and disjoining the first support member portion 10 and the second support member portion 20 requires a relatively small space. This is because for assembling the support structure according to the invention it is sufficient to lift the second support member portion 20 above the first support member portion 10 to an extent that ensures that the second support member portion 20 does not get hooked in the tab 11 of the first support member portion 10.

It is also not necessary to provide in front of or behind the support structure (in the slide direction) a room equal to or greater than the slide-direction dimension of the first support member portion 10 or the second support member portion 20. As can be seen in FIG. 4, in the course of the assembly process, in the slide direction only a part of the second support member portion 20 (i.e., preferably a part smaller than 50%, more preferably a part smaller than 30%) extends beyond the first support member portion 10. As a result of that, the support structure can be assembled also in case no sufficient room is available in the slide direction for the entire second support member portion 20 to be directly introduced into the grooves 35 defined by the tabs 11, i.e., the second support member portion 20 can also be placed on the first support member portion 10 from above.

As soon as the second support member portion 20 is seated on the slide surface defined by the sliding edge 17 of the first support member portion 10, the second support member portion 20 can be moved (slid) along the slide direction. The sliding movement of the second support member portion 20 can preferably be facilitated also by the groove 35, the guide member 12a, and an insertion guide member 12b. The first support member portion 10 and second support member portion 20 can be fixed together in the desired position, preferably by applying releasable connections. In the preferred embodiment according to FIGS. 5 and 6, the first support member portion 10 is joined to the second support member portion 20 by applying a bolt 25, preferably through a securing bore 13 arranged on the first support member portion 10 and a securing-positioning bore 22 arranged on the second support member portion 20.

Figure 7:
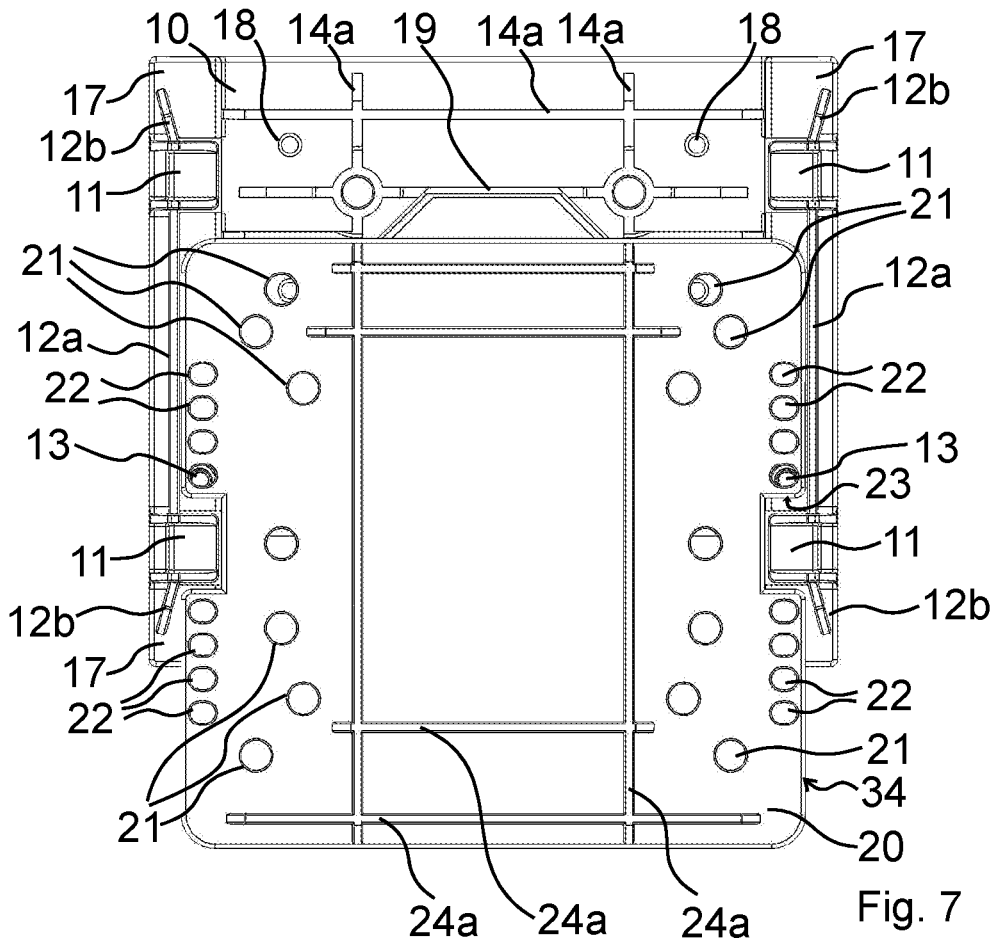
FIG. 7 is a top plan view of the support structure according to FIG. 4.
Figure 8:
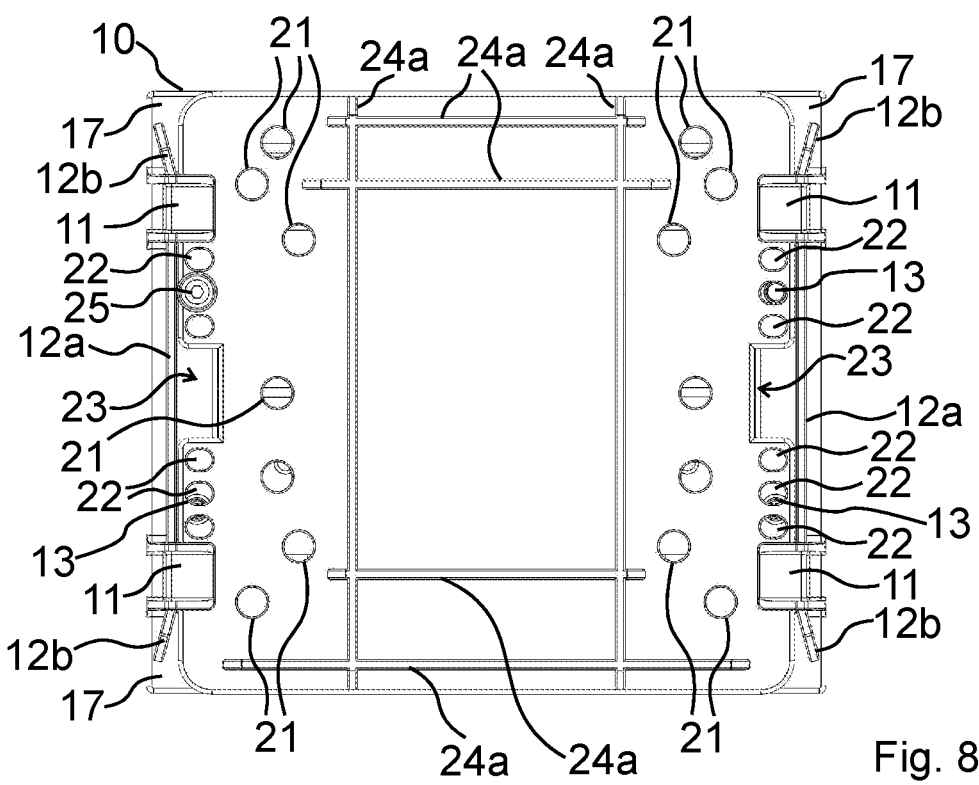
FIG. 8 is a top plan view of the support structure according to FIG. 1, FIGS. 9-13 are perspective drawings of the assembled support structure according to FIG. 1 with various pumps being secured to the support structure.

In FIGS. 7-8 the assembly process of the support structure according to the invention is illustrated in top plan views. For the sake of simplicity, the mountable component that can be secured to the support structure is not shown in FIGS. 7-8, either. The mountable component (for example a motor or pump) can be secured to the support structure preferably through mounting holes 21 formed in the second support member portion 20.

In FIG. 7, the assembly of the support structure is depicted in a position corresponding to the side view of FIG. 4. In the position shown in FIG. 7 the second support member portion 20 is arranged above the first support member portion 10 such that the cut-out 23 of the second support member portion 20 is located above the corresponding tab 11 which allows that the second support member portion 20 can be simply placed on the first support member portion 10 from above. As can be seen in FIG. 7, preferably this arrangement also contains a securing bore 13 and a securing-positioning bore 22 that are located above/under each other, and that enable the first support member portion 10 and the second support member portion 20 to be secured together by passing a retainer, for example a bolt 25 through them.

In a manner illustrated in FIG. 7, by sliding the first support member portion 10 and the second support member portion 20 relative to each other along a slide direction, the first support member portion 10 and the second support member portion 20 can be fixed to each other in a plurality of positions. In the preferred embodiment according to FIG. 7 the first support member portion 10 comprises a plurality of securing bores 13 formed in the slide surface of the sliding edge 17, preferably each sliding edge 17 comprising two securing bores 13, wherein the second support member portion 20 also comprises a plurality of securing-positioning bores 22 arranged spaced apart from each other, allowing the first second support member portion 10 and second support member portion 20 to be fixed together in a plurality of positions defined by the arrangement of the securing bores 13 and securing-positioning bores 22, preferably by applying a bolt 25; the bolt 25 can be applied for coupling together the first support member portion 10 and the second support member portion 20 preferably from above.

In FIG. 7 additional components of the first second support member portion 10 and second support member portion 20 can also be observed, for example the mounting holes 21 and their preferred arrangement, the stiffener members 14a, 24a and their preferred arrangements, and the guide member 12a and insertion guide member 12b adapted for guiding the second support member portion 20. In FIG. 7 there can also be seen preferred arrangements and configurations of component holes 18 adapted for securing the support structure to further structural components and a spacer member 19 adapted also for supporting the second support member portion 20.

FIG. 8 shows a top plan view of the support structure according to FIG. 1 in an assembled state. As compared to the position depicted in FIG. 7, in FIG. 8 the second support member portion 20 is shifted with respect to the first support member portion 10, while the second support member portion 20 is guided in a groove 35 defined by the tab 11 and preferably by the guide member 12a and the insertion guide member 12b.

If more than one securing bores 13 and securing-positioning bores 22 are applied, the securing bores 13 are arranged relative to the securing-positioning bores 22 such that they allow for positioning the second support member portion 20 relative to the first support member portion 10 with a smaller resolution than what is allowed by the spacings between the securing-positioning bores 22. In a manner also illustrated in FIG. 8, this is preferably implemented such that in a given attachment position one of the securing bores 13 has a position that enables the first support member portion 10 and the second support member portion 20 to be secured together with the help of a corresponding securing-positioning bore 22. In this state, an other (for example, a second) securing bore 13 is not aligned with any securing-positioning bore 22 but are in a position between two adjacent securing-positioning bores 22, such that the second support member portion 20 can be secured to the first support member portion 10 after displacing it by half the spacing between the securing-positioning bores 22. In the preferred exemplary implementation according to FIG. 8, therefore, the attachment positions adapted for securing together the first support member portion 10 and second support member portions 20 are located spaced apart by half the spacing between the securing-positioning bores 22, i.e., the second support member portion 20 can be positioned with an accuracy corresponding to half of the spacing between the securing-positioning bores 22.

The first support member portion 10 and second support member portions 20 of the support structure according to FIGS. 1-8 preferably have a symmetrical configuration, which, if certain attachment points, e.g., some securing bores 13 and securing-positioning bores 22, are inaccessible or are difficult to reach, allows for using their symmetric counterparts that may be more easily accessible or easier to reach. The support structure can be assembled by applying a single point of attachment, preferably a single bolt 25, for example in a manner also depicted in FIG. 8.

Figure 9:
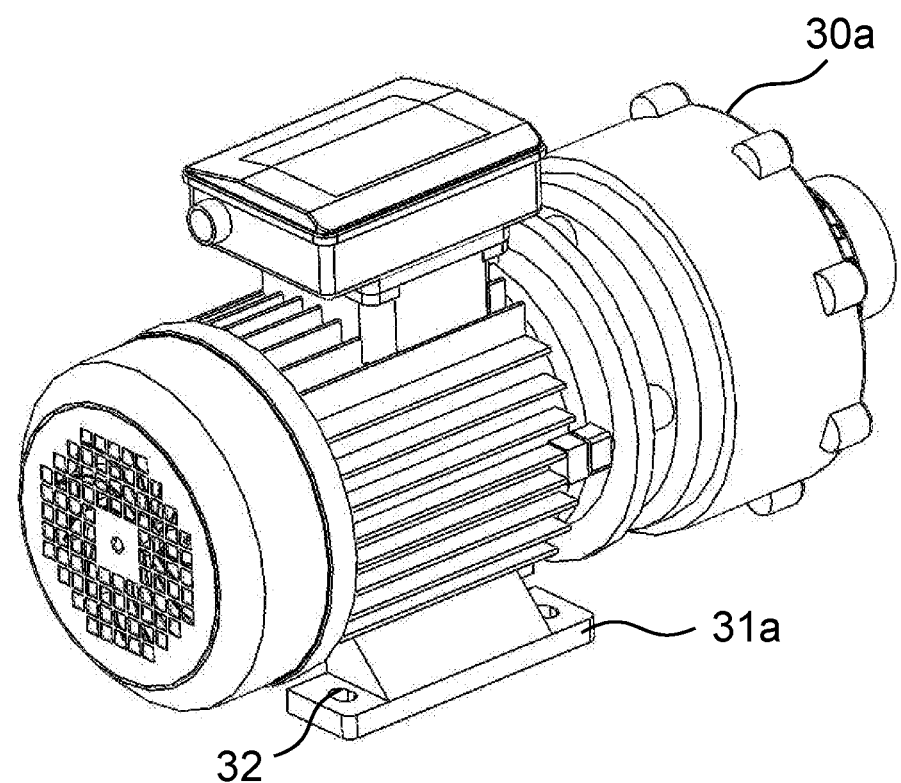
Figure 9:
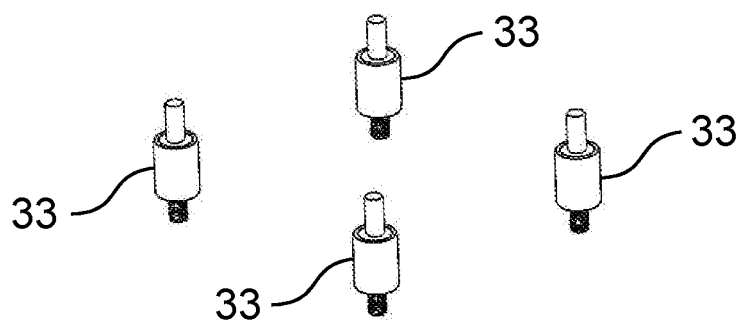
Figure 9:
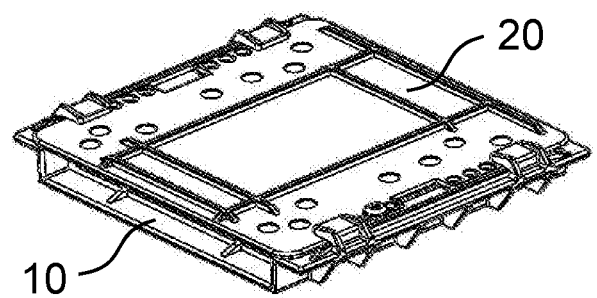

FIG. 9 illustrates a preferred mode of mounting a pump 30a (as an exemplary mountable component) on the support structure according to the invention. The pump 30a preferably comprises a pump base 31a in which one or more pump base holes 32 are formed adapted for allowing attachment to the second support member portion 20 according to the invention. The pump 30a is secured to the support structure preferably via one or more rubber brackets 33, wherein the rubber brackets 33 are adapted on the one hand to retain the pump 30a and on the other hand to damp the vibrations of the pump 30a. The rubber bracket 33 can be replaced by other, preferably resilient spacer members known from the prior art. To increase stability, the pump 30a is preferably secured to the second support member portion 20 of the support structure through at least three rubber brackets 33; in the preferred embodiment according to FIG. 9 the pump 30a is secured to the second support member portion 20 by four rubber brackets 33. The rubber brackets 33 can be secured to the pump base 31a and also to the second support member portion 20 of the support structure preferably by applying nuts. For the sake of easier handling, the rubber brackets and the second support member portion 20 can be attached to the pump 30a before installation, and then the second support member portion 20 (together with the pump 30a) can be secured to the first support member portion 10 in ways illustrated in FIGS. 2-8.

In the second support member portion 20 preferably mounting holes 21 are formed for receiving the rubber brackets 33, wherein the mounting holes 21 are preferably arranged in the second support member portion 20 such that the position of the mounting holes 21 corresponds to the position of the pump base holes 32. The second support member portion 20 preferably comprises a greater number of mounting holes 21 than the number of pump base holes 32 arranged on the pump base 31a, which preferably allows for selecting at least a group of mounting holes 21 that has a number and arrangement corresponding to the number and arrangement of the pump base holes 32 of the particular pump 30a to be installed.

The configuration of the second support member portion 20 allows that the support structure according to the invention can be applied with various pump types; see the pumps 30a, 30b, 30c, 30d, 30e in FIGS. 9-13. The mounting holes 21 of the second support member portion 20 of the support structure according to the invention can be preferably used for mounting various types of pumps 30a, 30b, 30c, 30d, 30e. Such cases are illustrated also in FIGS. 10 and 11.

FIGS. 10-13 illustrate the mounting of further pumps 30b, 30c, 30d, 30e on the support structure according to the invention. The pumps 30a, 30b, 30c, 30d, 30e according to FIGS. 9-13 are typically of different types with different dimensions, mass, weight distribution, etc., because of which the pumps 30a, 30b, 30c, 30d, 30e are preferably supported—or secured to the support structure, for example the second support member portion 20—at different positions.

Figure 10:
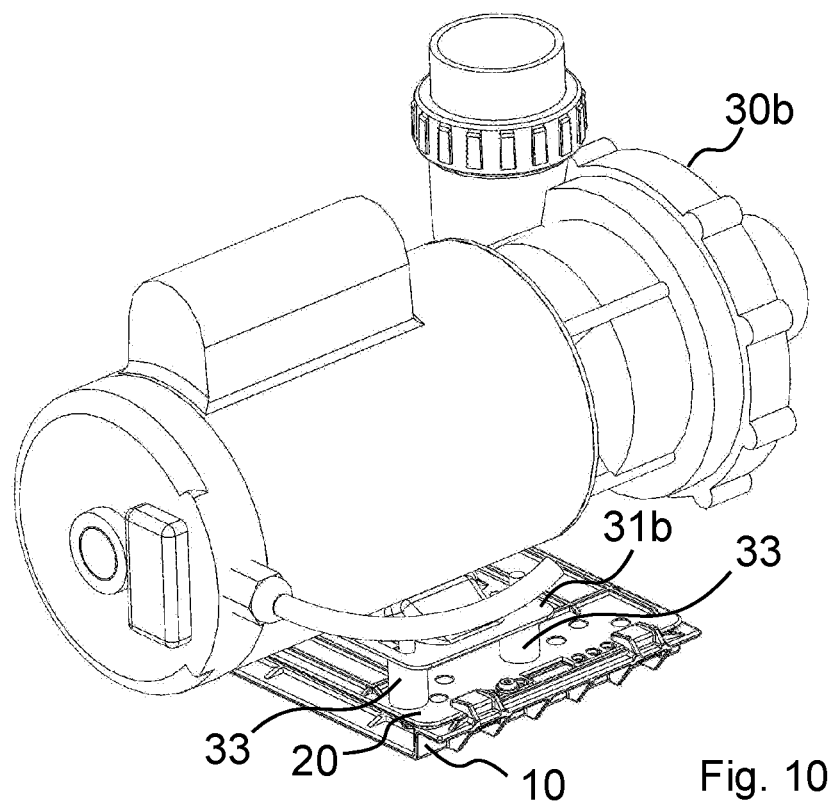

In FIG. 10, a pump 30b is shown that is mounted on the support structure according to the invention, wherein the pump 30b comprises an integrally made pump base 31b, and pump base holes 32 adapted for receiving the rubber brackets 33 are formed in this pump base 31b. The pump base 31b of the pump 30b preferably comprises four pump base holes 32, enabling the pump 30b to be secured to the second support member portion 20 of the support structure according to the invention via four rubber brackets 33. Like with FIG. 9, the rubber brackets 33 are secured to the pump 30b and to the second support member portion 20 by applying nuts or other attachment method known from the prior art.

In a manner described above in relation to FIG. 9, installation of the pump 30b preferably begins with securing the pump 30b to the second support member portion 20 of the support structure, preferably followed by a step of connecting the second support member portion 20—together with the pump 30b secured thereto—to the first support member portion 10.

Figure 11:
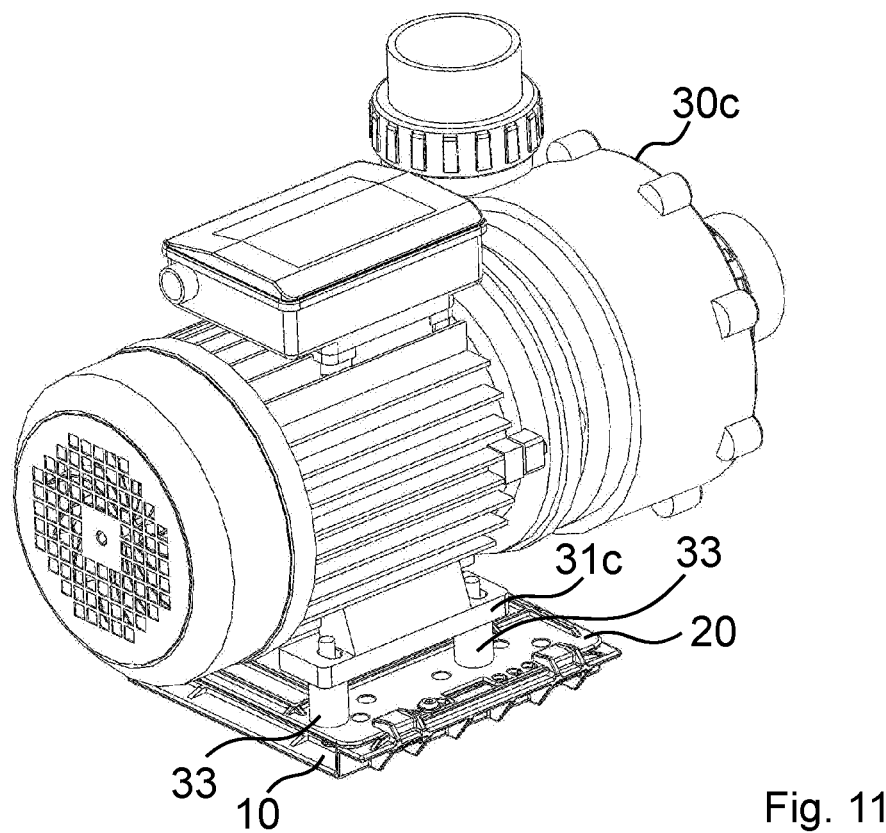

FIG. 11 illustrates a preferred way of securing another type of pump 30c to the second support member portion 20 of the support structure according to the invention. The pump 30c according to FIG. 11 comprises two pump bases 31c, wherein each of the pump bases 31c have two respective pump base holes 32 adapted for securing the pump to the second support member portion 20, preferably for receiving rubber brackets 33. The pump 30c according to FIG. 11 has a larger size compared to the pump 30b of FIG. 10, so the pump base holes 32 are located further apart from each other on the pump bases 31c. In spite of that, some of the mounting holes 21 may be applied for securing both the pump 30b of FIG. 10 and the pump 30c of FIG. 11, as it can be seen in FIGS. 10 and 11.

Figure 12:
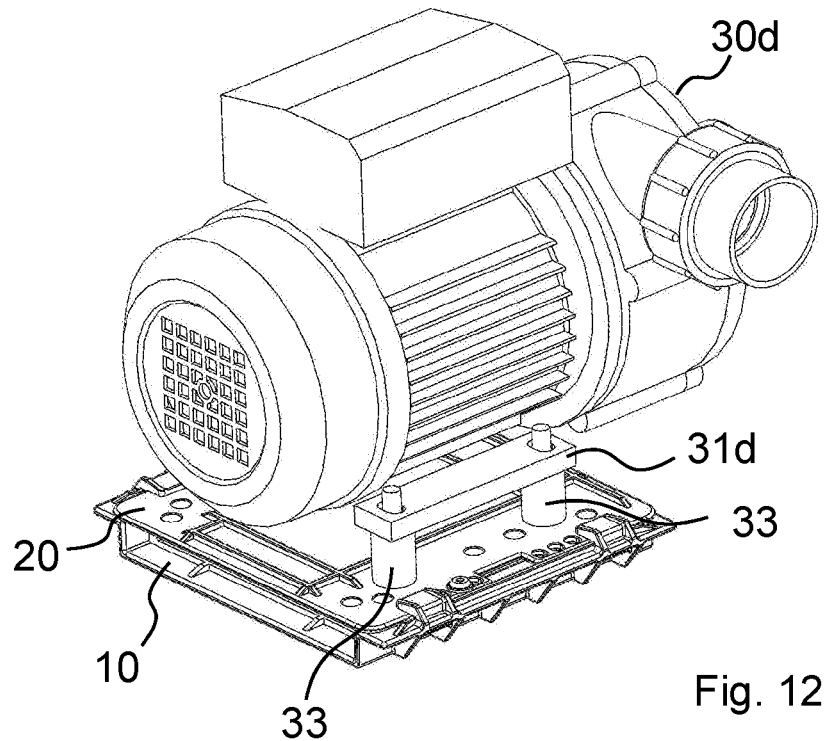
Figure 13:
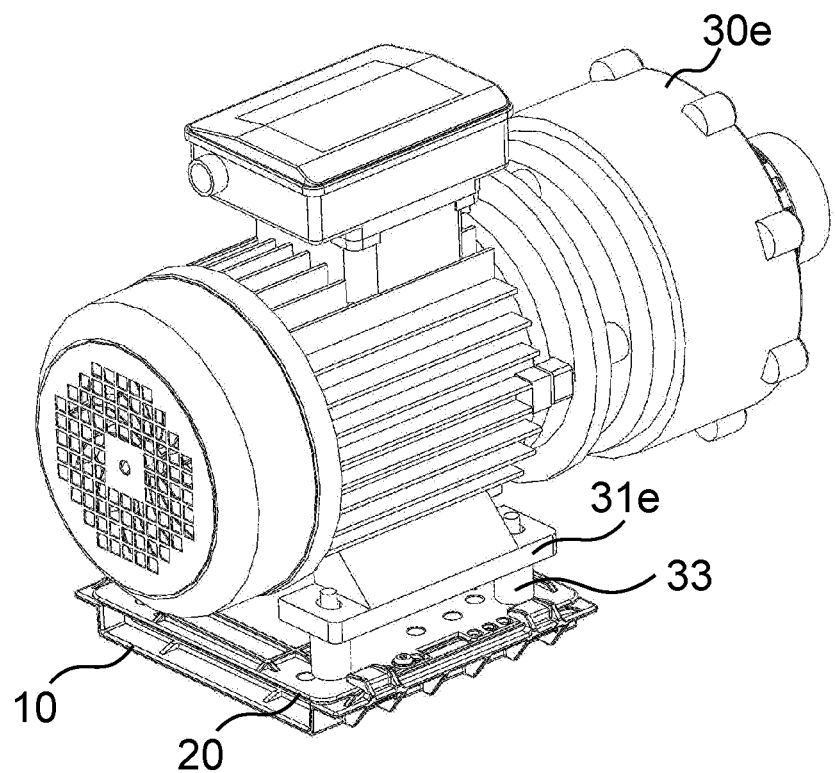

In FIGS. 12 and 13, respective further preferred implementations of mounting a pump 30d and a pump 30e on the second support member portion 20 of the support structure according to the invention are shown. As with the pump 30a and the pump 30c according to FIGS. 9 and 11, the pump 30d and the pump 30e according to FIGS. 12 and 13 each comprise two respective pump bases 31d and 31e, wherein pump base holes 32 are preferably formed therein for securing the pumps to the second support member portion 20 of the support structure according to the invention. The pumps 30d, 30e can be secured to the second support member portion 20 preferably in the same way as the pumps 30a, 30b, 30c, for example via rubber brackets 33.

In the cases illustrated in FIGS. 9-13, the pumps 30a, 30b, 30c, 30d, 30e can be secured to the second support member portion 20 of the support structure according to the invention preferably via rubber brackets 33. Due to the different dimensions of the pumps 30a, 30b, 30c, 30d, 30e and the applied rubber brackets 33, the pump base holes 32 and the mounting holes 21 may have different dimensions, for example different diameters. Preferably, each of the mounting holes 21 is arranged in the second support member portion 20 such that the rubber brackets 33 passed through the mounting holes 21 and the components applied for retaining them (for example, nuts) do not block the movement (sliding) of the second support member portion 20 relative to the first support member portion 10.

FIGS. 14-19 depict preferred embodiments of the second support member portion 20 in various views.

Figure 14:
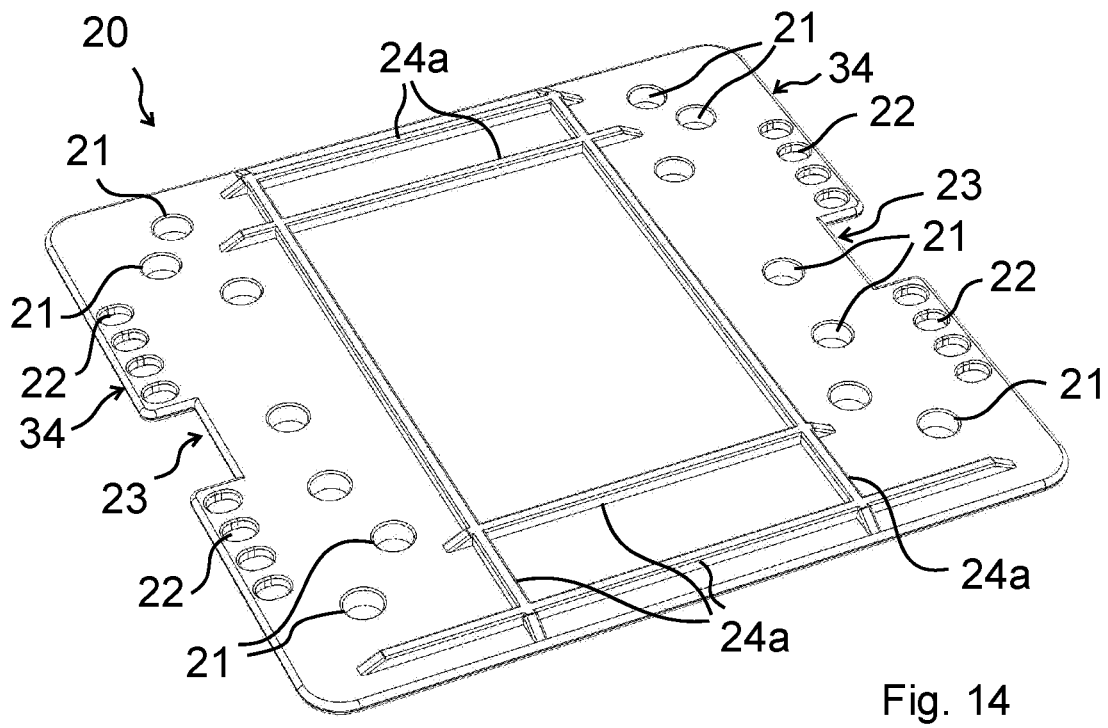
FIG. 14 shows, in a perspective view, a preferred configuration of the second support member portion of the support structure according to the invention.
Figure 15:
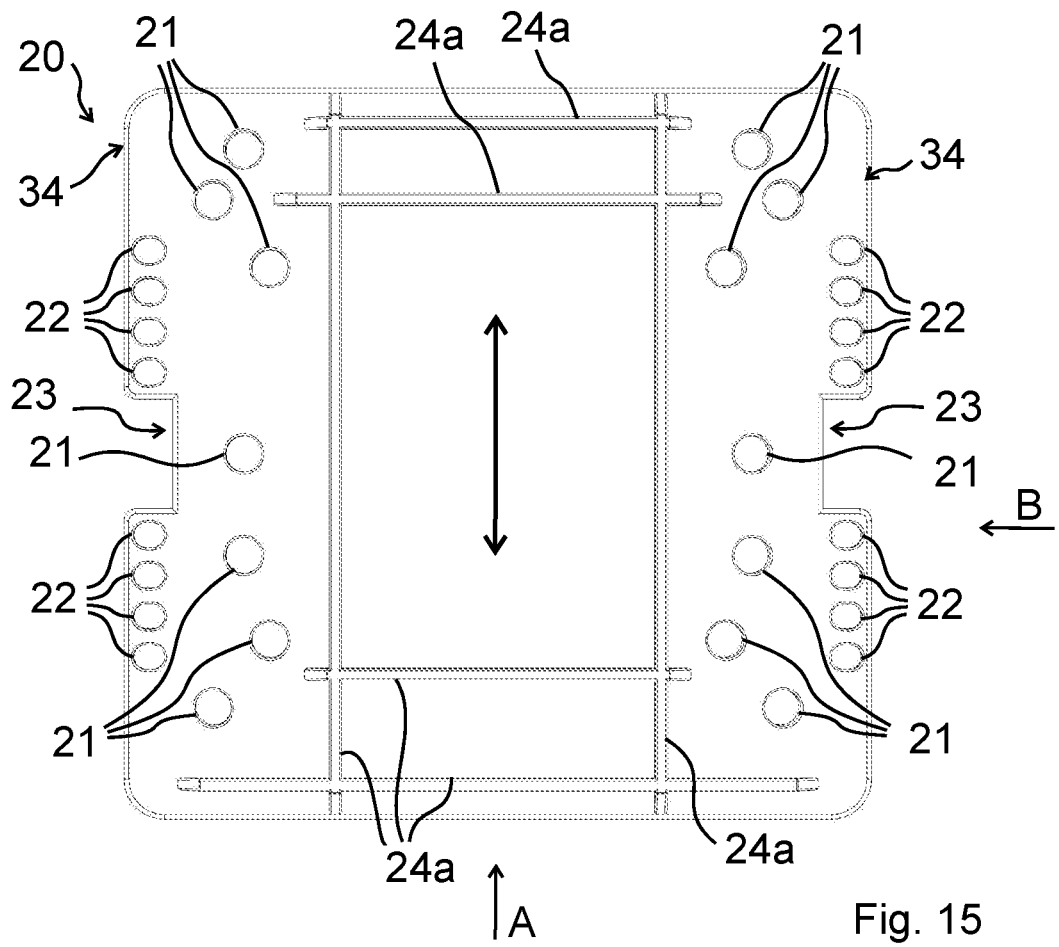
FIG. 15 is a top plan view of the second support member portion according to FIG. 14.

FIGS. 14 and 15 show, respectively, the perspective view and the top plan view of the top side (as shown in FIG. 1) of the second support member portion 20 of the support structure according to the invention. The second support member portion 20 of the support structure according to the invention preferably has a rectangular configuration, wherein the rectangle shape is preferably rounded off at the corners. The rounded corners enable that the second support member portion 20 can be more easily introduced into the first support member portion 10 and can more easily slide therein, while a second support member portion 20 configured with rounded corners also does not get stuck while sliding in the first support member portion 10 in case it is slightly rotated. The second support member portion 20 is preferably made of a lightweight and strong (load bearing) material, for example plastic, preferably a polymer material.

In the second support member portion 20 of the support structure mounting holes 21 are formed, into which pumps, for example the pumps 30a, 30b, 30c, 30d, 30e according to FIGS. 9-13 or motors can be mounted, preferably via rubber brackets 33, as it was set forth above in relation to the previous figures. The mounting holes 21 according to FIG. 14 and FIG. 15 preferably have identical dimensions, i.e., as it can be seen in FIG. 15, identical cross-sectional size; however, in further preferred embodiments the mounting holes 21 may have different dimensions (diameter). Preferably, a pump 30a, 30b, 30c, 30d, 30e of a particular type, is secured via mounting holes 21 of identical configuration and size.

To ensure the mechanical stability of the second support member portion 20, the mounting holes 21 are arranged spaced apart from each other, wherein the spacing between them is preferably dependent on the number of the different pumps 30a, 30b, 30c, 30d, 30e to be installed, the number of the mounting holes 21, and the material and thickness of the second support member portion 20. In the preferred embodiment according to FIGS. 14 and 15 the mounting holes 21 adapted for securing the pumps 30a, 30b, 30c, 30d, 30e are arranged symmetrically to the longitudinal axis of the second support member portion 20 coinciding with the insertion direction (slide direction) of the second support member portion 20 into the first support member portion 10. Such an arrangement of the mounting holes 21 allows that the different pumps 30a, 30b, 30c, 30d, 30e exert an approximately identical load on the second support member portion 20, thus minimising the deformation of the second support member portion 20.

To further improve the mechanical stability of the second support member portion 20, the second support member portion 20 further comprises one or more stiffener members 24a, wherein the stiffener members 24a are preferably implemented as stiffening ribs. If more than one stiffener members 24a are applied, the stiffener members 24a can be arranged parallel and/or transversely (for example, perpendicular) to each other. Stiffener members 24a arranged transversely to each other significantly improve the stability of the second support member portion 20 and prevent the second support member portion 20 from getting deformed. In the preferred embodiments according to FIGS. 14 and 15 the stiffener members 24a are arranged in the slide direction and in a direction perpendicular thereto, wherein multiple parallelly extending stiffener members 24a are provided in all directions. The stiffener members 24a are preferably made of the material of the second support member portion 20, more preferably the stiffener members 24a are made integrally with the second support member portion 20, i.e., the stiffener members 24a from an integral part of the second support member portion 20. Another preferred embodiment can be provided by securing the stiffener members 24*a* to the second support member portion 20 after making the second support member portion.

The second support member portion 20 comprises a cut-out 23 disposed along its edge 34 extending in the slide direction; in the preferred embodiment according to FIGS. 14-15 the second support member portion 20 comprises a respective cut-out 23 disposed along both of its edges 34 extending in the slide direction. The shape of the cut-out 23 corresponds to the tab 11 of the first support member portion 10, preferably to the outside dimensions of the tab 11, whereby the tab 11 can be passed through the cut-out 23 and the second support member portion 20 can be placed on the first support member portion 10.

In the preferred embodiment according to FIGS. 14 and 15 the second support member portion 20 of the support structure according to the invention comprises a rectangular cut-out 23, the shape of the cut-out 23 corresponding to the tab 11 located on the first support member portion 10 that also has a rectangular configuration (top plan shape).

The second support member portion 20 according to FIGS. 14 and 15 comprises at least one securing-positioning bore 22 facilitating the securing of the first support member portion 10 of the support structure according to the invention to the second support member portion 20 thereof. The second support member portion 20 according to FIGS. 14 and 15 comprises, like in the configuration illustrated in FIG. 1, a plurality of securing-positioning bores 22, wherein the securing-positioning bores 22 are arranged along the slide direction, spaced apart (preferably equally) from each other. The securing-positioning bores 22 that are arranged equally spaced apart from each other enable that the first support member portion 10 can be secured to the second support member portion 20 in various positions in the support structure according to the invention, whereby the mountable component attached to the second support structure 20, for example a pump 30*a*, 30*b*, 30*c*, 30*d*, 30*e* can be positioned easily and precisely.

To enable the first support member portion 10 and the second support member portion 20 to be secured together, the securing-positioning bores 22 are arranged along the edge 34 or edges 34 of the second support member portion 20 extending along the slide direction, and thus, by sliding the second support member portion 20 along the slide direction, one of the securing-positioning bores 22 can be brought into a position that corresponds to the position of one of the securing bores 13 formed in the sliding edge 17 of the first support member portion 10, allowing the first support member portion 10 and second support member portion 20 to be fixed together by means of the mutually corresponding securing-positioning bore 22 and securing bore 13, for example by applying a bolt 25 (see FIGS. 5-6). According to the description included above, the first support member portion 10 and second support member portion 20 can be secured fixed in further ways and by further means known from the prior art, preferably by a releasable connection.

Figure 18:
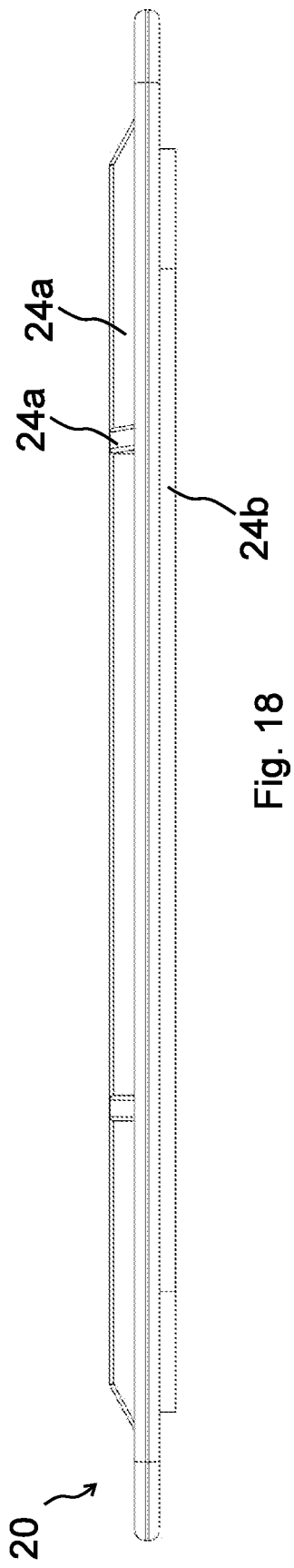
FIG. 18 is a front view of the second support member portion according to FIG. 15.
Figure 19:
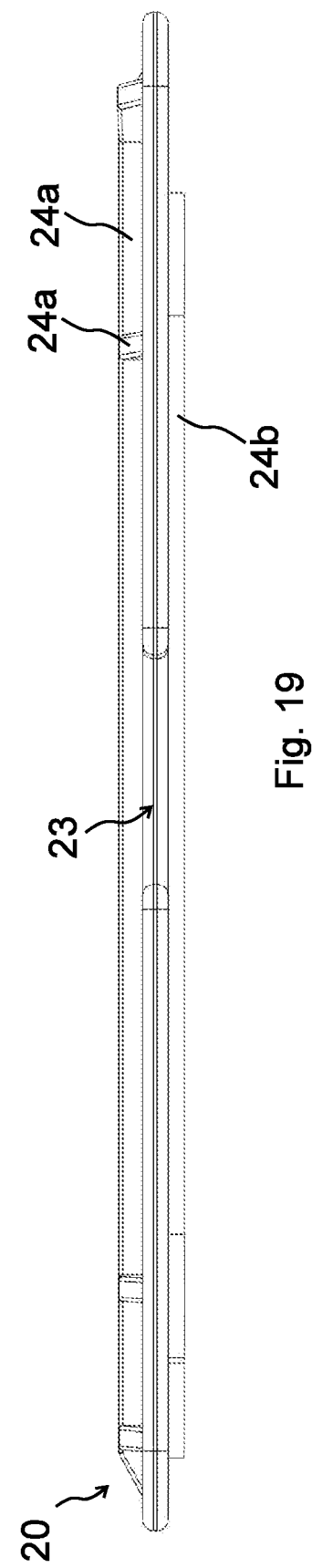
FIG. 19 is a side view of the second support member portion according to FIG. 15.

FIGS. 18 and 19 show, respectively, the front view (as seen from the direction indicated by the arrow A in FIG. 15) and the side view (as seen from the direction indicated by arrow B in FIG. 15) of the preferred second support member portion 20 according to FIGS. 14-15.

Figure 16:
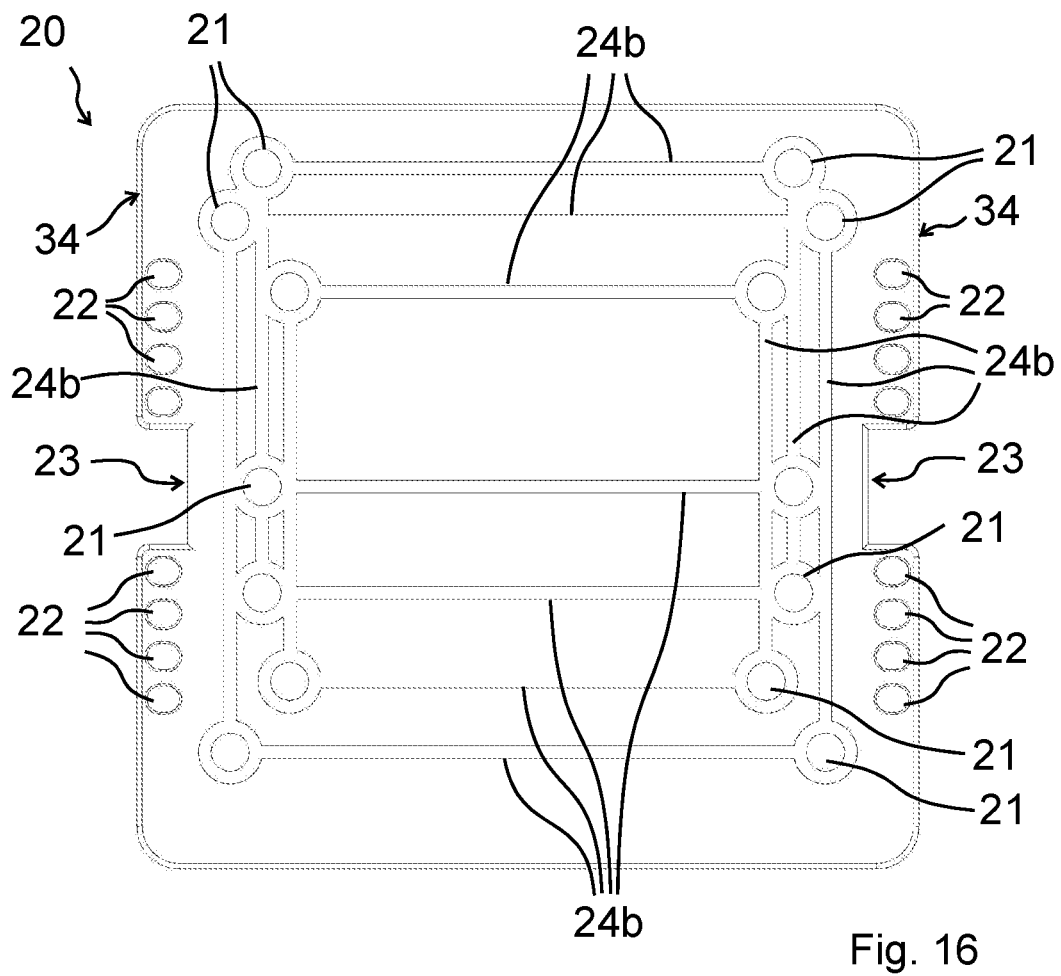
FIG. 16 is a bottom view of the second support member portion according to FIG. 14.
Figure 17:
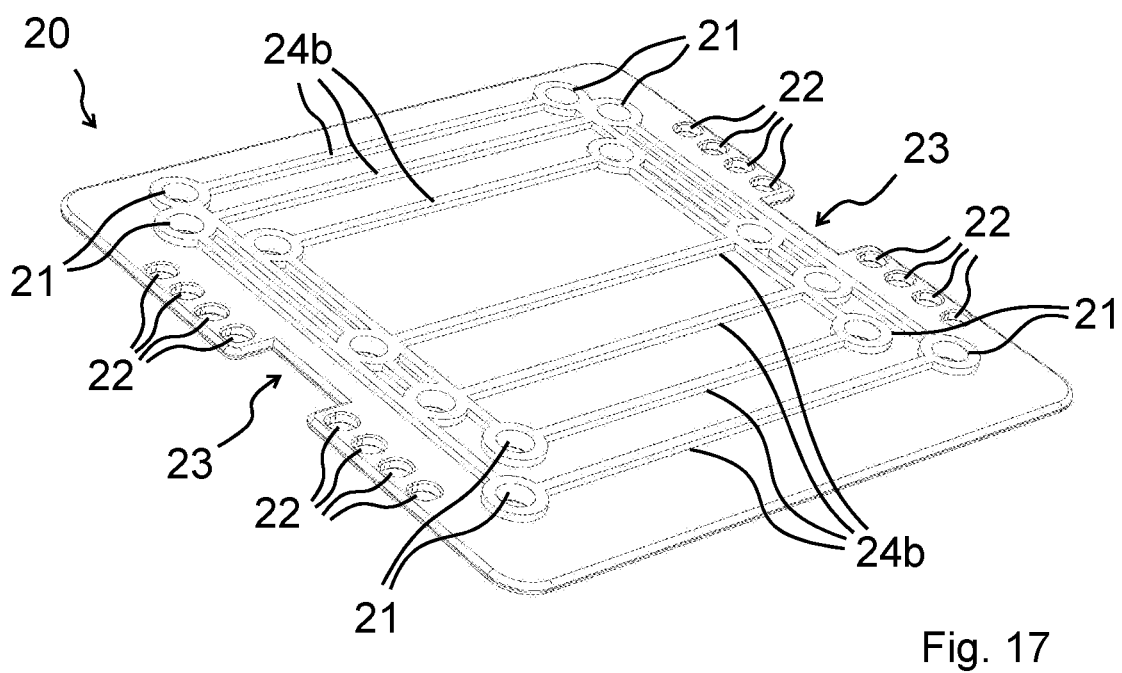
FIG. 17 is a perspective view of the underside of the second support member portion according to FIG. 14.

FIG. 16 is a bottom view of the preferred embodiment of the second support member portion 20 of the support structure according to the invention illustrated in FIGS. 14-15, while FIG. 17 shows, in perspective view, the underside of the second support member portion 20 according to FIG. 16.

The preferably rectangular configuration of the second support member portion 20 of the support structure according to the invention can also be observed in FIG. 16, wherein the corners of the rectangle are preferably rounded off as per the considerations set forth in relation to FIGS. 14 and 15.

Furthermore, in FIGS. 16 and 17 there can also be observed the mounting holes 21 that are preferably implemented as through holes formed in the material of the second support member portion 20 and are adapted for securing a mountable component (i.e., a component mountable on the support structure), for example a motor or pump, by way of example the pumps 30*a*, 30*b*, 30*c*, 30*d*, 30*e* according to FIGS. 9-13. The mounting holes 21 are preferably reinforced in a circular manner, which circular reinforcement is preferably formed from the material of the second support member portion 20, for example by thickening the material. Alternatively, the circular reinforcement can also be attached to the second support member portion 20 subsequently.

The second support member portion 20 is preferably also provided with longitudinal (i.e., extending in the slide direction) and/or transversal (i.e., extending transversely to the slide direction) second stiffener members 24*b* on its side that is shown in FIGS. 16 and 17. The second stiffener members 24*b* are preferably adapted for interconnecting the mounting holes 21 and/or the circular reinforcements thereof. The second stiffener members 24*b* are preferably made of the material of the second support member portion 20, more preferably the stiffener members 24*b* are made integrally with the second support member portion 20, i.e., the stiffener members 24*b* form an integral part of the second support member portion 20. Another preferred embodiment can be provided by securing the stiffener members 24*b* to the second support member portion 20 subsequently.

The second stiffener members 24*b* are preferably arranged between mounting holes 21 adapted for mounting a given mountable component, for example a given pump 30*a*, 30*b*, 30*c*, 30*d*, 30*e*, whereby the second stiffener members 24*b* also provide visual aid for identifying the mounting holes 21 that should be used together, so they make it easier to use the support structure according to the invention.

In a manner described above in relation to FIGS. 14-15, the second support member portion 20 is provided with a securing-positioning bore 22 and preferably a plurality of securing-positioning bores 22 at its edges 34 extending along the slide direction, wherein the securing-positioning bores 22 are preferably arranged spaced apart from each other, preferably equally spaced apart from each other. The securing-positioning bores 22 spaced apart from each other allow that the second support member portion 20 can be secured to the first support member portion 10 in a plurality of definite positions.

Preferably, a cut-out 23 is also formed in the second support member portion 20 at its edge 34 or edges 34 extending along the slide direction, the shape of which corresponds to the tab 11 of the first support member portion 10 of the support structure according to the invention. The features of the cut-out 23 according to FIGS. 16-17 are identical to the features already described in relation to FIGS. 14-15.

In the preferred embodiment of the support structure according to the invention depicted in FIGS. 16-17 two cut-outs 23 are formed in opposite edges 34 of the second support member portion 20. A further preferred embodiment can be obtained in case only one cut-out 23 is disposed on the second support member portion 20, wherein the second support member portion 20 can be assembled with the first support member portion 10 by inserting the edge 34 not having a cut-out 23 into the groove 35 defined by the corresponding tab 11 of the first support member portion 10 along the slide direction, followed by placing the second support member portion 20 on the first support member portion 10 by passing the cut-out 23 around a further tab 11 of the first support member portion 10.

In the preferred embodiment depicted in FIGS. 16-17 the securing-positioning bores 22 are arranged on both sides (i.e., not only on one side) of the cut-out 23 along the slide direction, which allows that—after placing the second support member portion 20 on the first support member portion 10—the second support member portion 20 is slidable both ways (for example, according to the depiction of FIG. 16, forward and backward) in the slide direction in order to secure the second support member portion 20 to the first support member portion 10. This preferred configuration allows for securing together the first support member portion 10 and second support member portion 20 in an even greater number of definite positions, which further improves the positioning possibilities of the mountable component (for example the pumps 30a, 30b, 30c, 30d, 30e) mounted on the support structure.

In FIGS. 18 and 19 the second support member portion 20 is shown in a front view (as seen from the direction indicated with arrow A in FIG. 15) and in a side view (as seen from the direction indicated with arrow B in FIG. 15), respectively. The stiffener members 24a and the stiffener members 24b can also be seen in the front view of FIG. 18 and in the side view shown in FIG. 19. In the preferred embodiment according to FIGS. 18-19, the stiffener members 24a and 24b protrude from the second support member portion 20 approximately to the same degree, however, in other preferred embodiments the stiffener members 24a and the stiffener members 24b may have different dimensions and configuration, depending on the available space and on the required stiffening action.

In the side view of FIG. 19, the cut-out 23 and its preferred position can also be seen.

Figure 20:
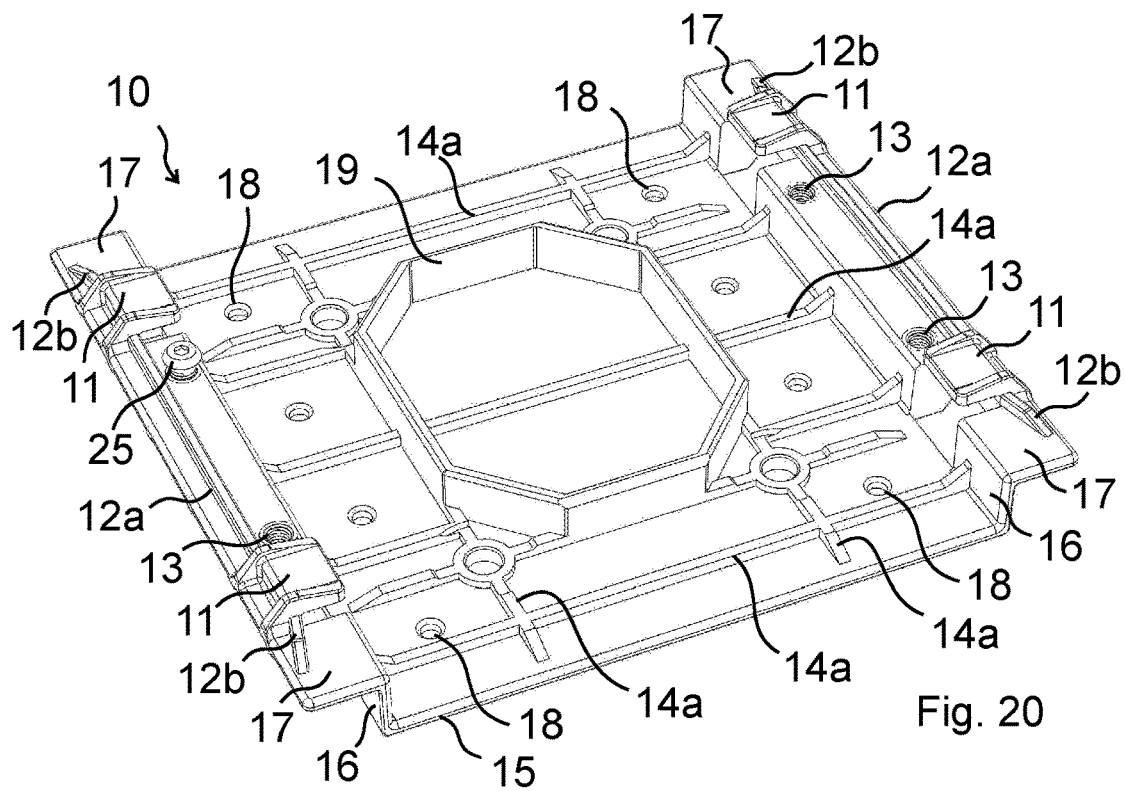
FIG. 20 shows, in a perspective view, a preferred configuration of the first support member portion of the support structure according to the invention.
Figure 21:
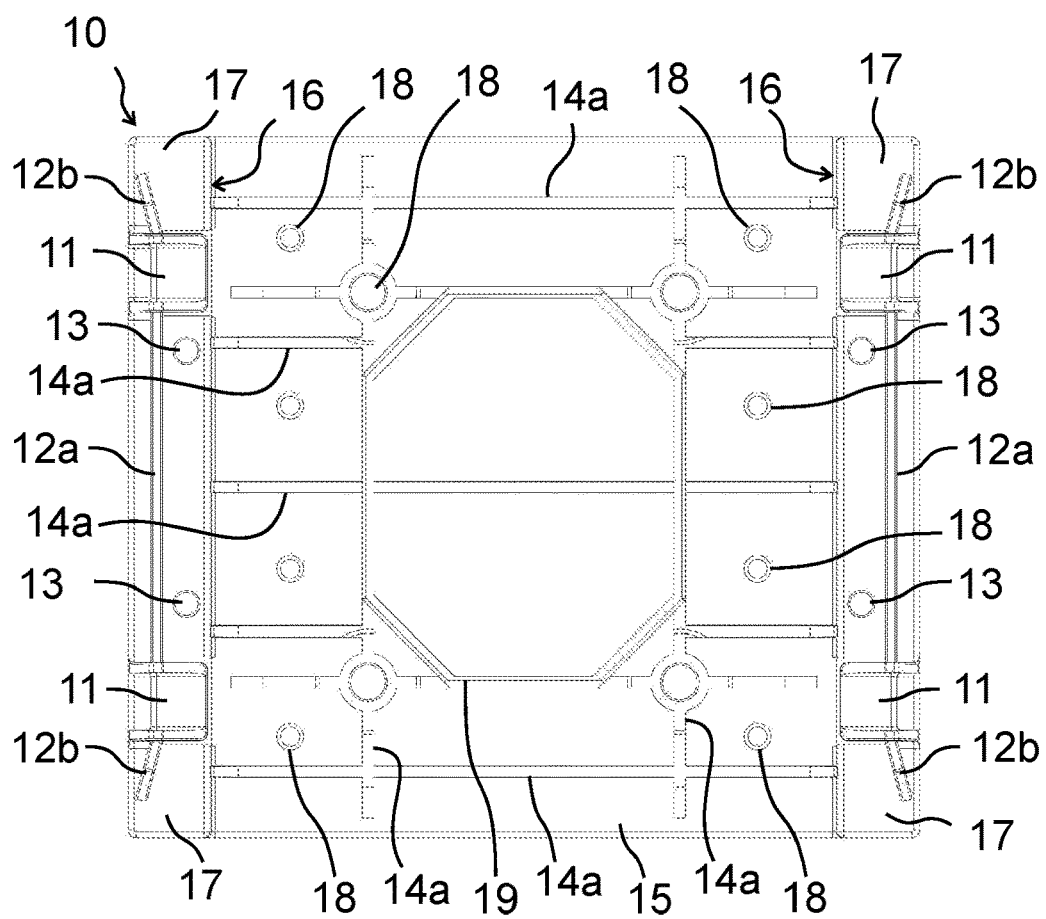
FIG. 21 is a top plan view of the first support member portion according to FIG. 20.
Figure 22:
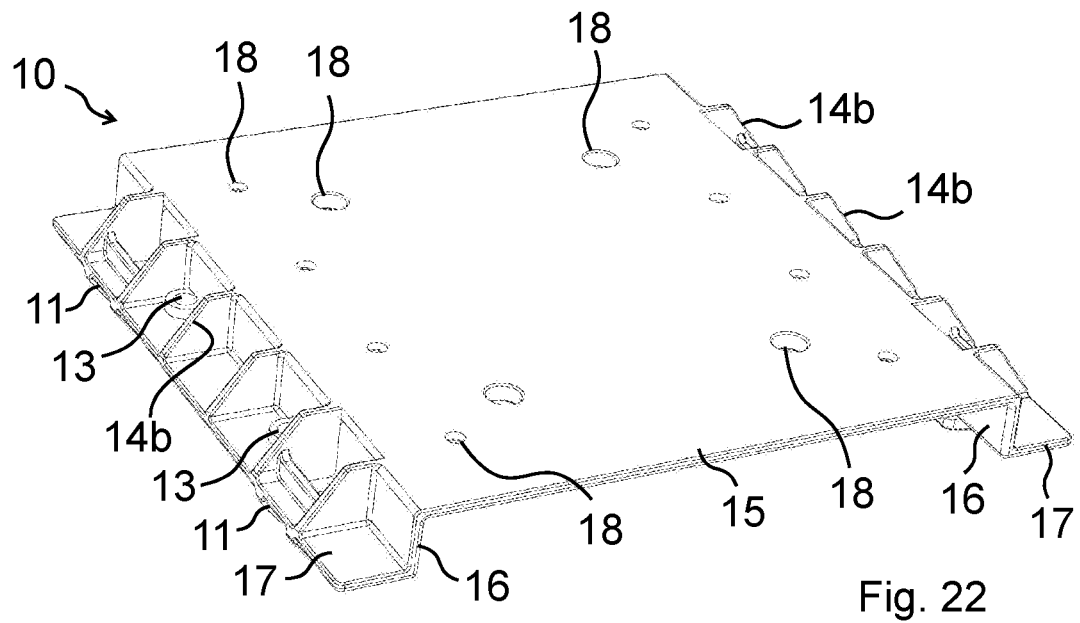
FIG. 22 is a perspective view of the underside of the first support member portion according to FIG. 20.
Figure 23:
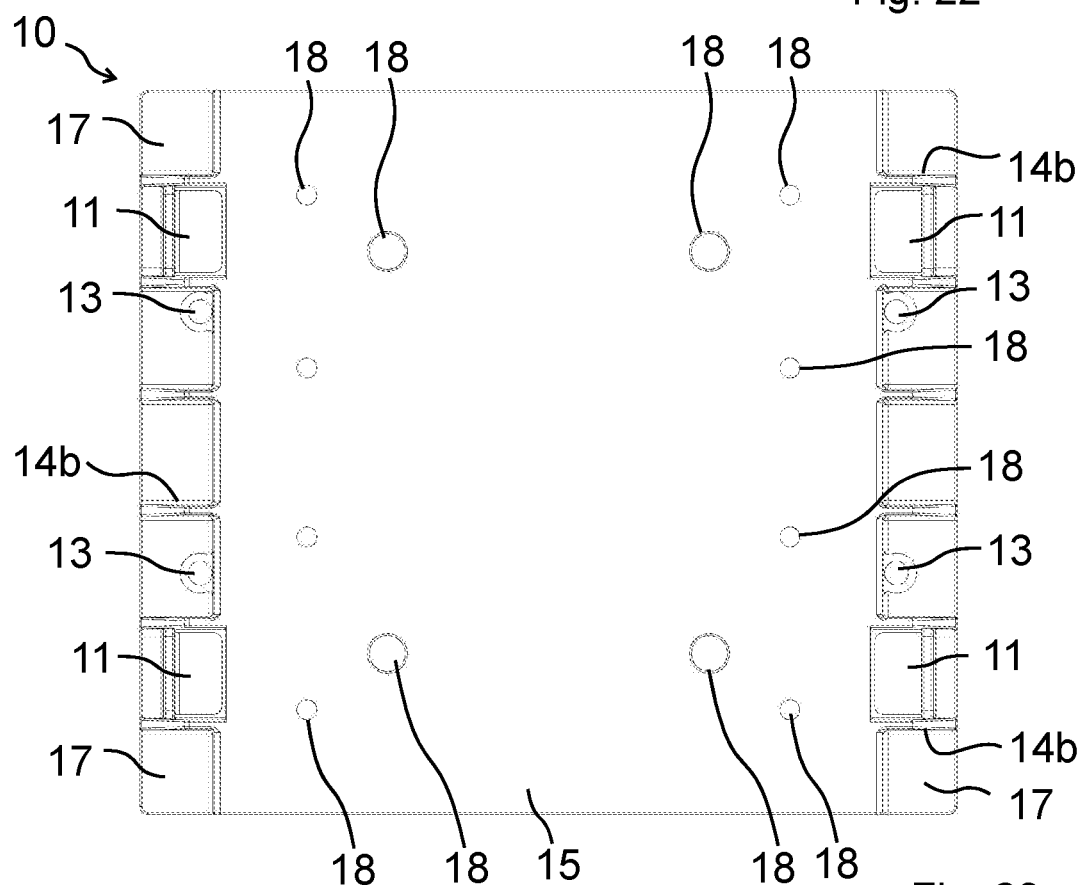
FIG. 23 is a bottom view of the first support member portion according to FIG. 20.
Figure 24:
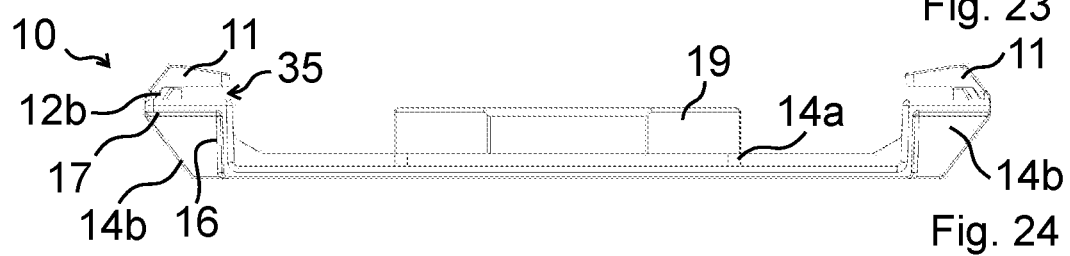
FIG. 24 is a front view of the first support member portion according to FIG. 20.

FIGS. 20-24 illustrate a preferred embodiment of the first support member portion 10 of the support structure according to the invention in various views, wherein FIG. 20 is a top perspective view of the first support member portion 10, FIG. 21 is a top plan view of the first support member portion 10, FIG. 22 is another (underside) perspective view of the first support member portion 10, FIG. 23 is a bottom view of the first support member portion 10, and FIG. 24 is the front view of the first support member portion 10.

The first support member portion 10 of the support structure according to the invention is preferably configured for being connected to the second support member portion 20 and for being connected or attached to other structural components. This of course does not preclude attaching the mountable component to the first support member portion 10, in which case the support structure can be connected to the further structural components through the second support member portion 20.

The first support member portion 10 comprises a base plate 15 on which component holes 18 adapted for providing connection to the further structural components are preferably disposed. The component holes 18 can have different dimensions, preferably depending on the features of the structural component to be connected and the way it is attached. Via the component holes 18 the first support member portion 10 can be coupled to the appropriate structural component in any manner known from the prior art. For example, in the case of a support structure adapted for securing the pumps of tubs and pools equipped with circulation means or having a massage function (for example the pumps 30a, 30b, 30c, 30d, 30e according to FIGS. 9-13), the support structure can be preferably secured to a frame structure of the tub or pool via the component holes 18.

To provide reinforcement and stiffening of the base plate 15, the first support member portion 10 preferably comprises a stiffener member 14a, more preferably it comprises a plurality of mutually transversely disposed stiffener members 14a. The configuration of the stiffener members 14a of the first support member portion 10 is preferably identical to the configuration of the first stiffener members 24a and/or second stiffener members 24b of the second support member portion 20, for example the stiffener members 14a can be implemented as stiffening ribs. Preferably, the stiffener members 14a are arranged between particular component holes 18, and, if so desired, circular reinforcement can also be provided around the component holes 18 like with the circular reinforcement that can be implemented around the mounting holes 21 described also in FIG. 16. The circular reinforcement and the stiffener members 14a can form integral parts of the first support member portion 10 and can be preferably provided for example by thickening the material of the first support member portion 10. The circular reinforcements around the component holes 18 and the stiffener members 14a can also be formed on the first support member portion 10 or can be attached to the first support member portion 10 subsequently.

The first support member portion 10 further comprises a sliding edge 17 that is configured to protrude from the base plate 15 and is adapted to define a slide surface extending in the slide direction, along which surface the second support member portion 20 may slide relative to the first support member portion 10. In a horizontally oriented position of the support structure according to the invention (see FIGS. 4-6), the edge 34 or edges 34 of the second support member portion 20 extending along the slide direction are preferably seated on the slide surface defined by the sliding edge 17, whereby the sliding edge 17 contributes to retaining and supporting the second support member portion 20 and the mountable component (for example, the pump 30a, 30b, 30c, 30d, 30e according to FIGS. 9-13) attached to it. The greater the extension of the sliding edge 17 perpendicular to the slide direction, the more stable the support provided for the second support member portion 20.

The protrusion of the sliding edge 17 is preferably implemented by providing a wall 16 between the base plate 15 and the sliding edge 17. In the preferred arrangement according to FIGS. 20-24, the wall 16 is attached to both the base plate 15 and the wall 17 approximately perpendicularly (see FIG. 24), however, the wall 16 can be joined to the base plate 15 and to the sliding edge 17 at a different angle, for example in an inclined manner.

Due to the elevated configuration of the sliding edge 17 with respect to the base plate 15 a spacing can be formed between the base plate 15 and the slide surface of the sliding edge 17, and thereby a sufficient room becomes available for securing the mountable component to the second support member portion 20. By way of example, the pump 30a, 30b, 30c, 30d, 30e according to FIGS. 9-13 is attached to the second support member portion 20 preferably via rubber brackets 33, wherein the rubber brackets 33 are introduced into the corresponding mounting holes 21 (through holes)

and can be retained at the opposite side of the second support member portion 20 by preferably applying nuts. To prevent the nut applied for retaining the mountable component from hampering the relative sliding movement of the first support member portion 10 and second support member portion 20, a spacing corresponding to the dimensions (height) of the nut is required between the base plate 15 and the slide surface of the sliding edge 17, i.e., the spacing must be greater than the height of the nut applied for retaining the mountable component. More preferably the spacing should be greater than the height or head height of the retainer member (bolt, nut) adapted for retaining the mountable component.

To prevent the retainer members adapted for retaining the mountable component and the retainer members of additional structural components from blocking the relative (sliding) movement of the first support member portion 10 and the second support member portion 20, the component holes 18 and the mounting holes 21 are preferably arranged in different positions transversely to the slide direction, and thus the retainer members do not cross each other's path during the sliding movement.

In addition to the sliding edge 17, the first support member portion 10 also comprises a spacer member 19 that contributes to supporting the second support member portion 20 and also assists in maintaining the spacing created by the wall 16 in the regions of the support structure situated further away from the wall 16. The spacer member 19 is preferably disposed in such a region or in such regions of the first support member portion 10 that are expected to be subjected to the maximum load exerted on the second support member portion 20 by the mountable component, so the spacer member 19 can preferably also prevent the deformation or buckling of the second support member portion 20. The spacer member 19 is preferably made of the material of the first support member portion 10; preferably the latter is made is integrally with the spacer member 19, or the alternatively the spacer member 19 can be mounted on (secured to) the first support member portion 10 subsequently. Furthermore, the spacer member 19 is preferably arranged on the first support member portion 10 such that it does not block the relative movement (sliding) of the first support member portion 10 and the second support member portion 20, implying that it also does not block the movement of the retainer members in the mounting holes 21 adapted for retaining the mountable component and the movement of the retainer members in the component holes 18 adapted for attaching the support structure to additional structural components.

The first support member portion 10 further comprises a tab 11 disposed spaced apart from the slide surface of the sliding edge 17, the tab 11 and the slide surface collectively defining a groove 35 adapted for receiving the second support member portion 20 (see FIG. 24), wherein the groove 35 is preferably adapted for guiding the second support member portion 20 along the slide direction.

In the preferred embodiment according to FIGS. 20-24, the first support member portion 10 of the support structure according to the invention comprises two sliding edges 17 that are in contact with the second support member portion 20 along two opposite sides, wherein the sliding edges 17 provide support for the second support member portion 20 along two opposite sides in the case of the horizontally oriented arrangement of the support structure depicted in the drawings. In the preferred embodiment according to FIGS. 20-24 each sliding edge 17 of the support structure comprises two tabs 11, wherein the grooves 35 defined by the tabs are able to stably secure and retain the second support member portion 20, preferably even if the support structure has a non-horizontal (i.e., for example, vertical) orientation. The grooves 35 formed by the tabs 11 disposed on both opposite sides are preferably able to retain the second support member portion 20 introduced into the grooves 35 also in an "upside down" position, i.e., in a position wherein the mountable component is secured under the support structure (i.e., hanging therefrom), and therefore neither the sliding edge 17 nor the spacer member 19 contributes to supporting the second support member portion 20.

For securing the first support member portion 10 to the second support member portion 20, preferably at least one securing bore 13 is formed in the sliding edge 17. By sliding the second support member portion 20 in the slide direction in the grooves 35 defined by the tabs 11, the securing bore 13 can be aligned with the securing-positioning bore 22 or with one of the securing-positioning bores 22 disposed on the second support member portion 20, wherein the first support member portion 10 and the second support member portion 20 are able to be secured together in a position defined by the securing bore 13 and the securing-positioning bore 22 by applying a retainer member, for example a bolt 25 (see FIGS. 5-6) passed through the mutually aligned securing bore 13 and securing-positioning bore 22. To provide a more stable attachment and to increase the number of the definite positions, more than one securing bores 13 can be formed in the sliding edge 17, so the first support member portion 10 and second support member portion 20 can preferably be secured together at more than one points. For easy assembly, the first support member portion 10 and the second support member portion 20 can be connected by means of the securing bore 13 and the securing-positioning bore 22 by applying a releasable connection. The application of a releasable connection, for example a bolted connection, makes it easier to assemble and disassemble the support structure in case the mountable component requires servicing or maintenance, or it needs to be replaced.

To provide even better guidance of the second support member portion 20 in the groove 35, a guide member 12a extending along the slide direction is disposed on the sliding edge 17 of the first support member portion 10. If the first support member portions 10 and second support member portion 20 of the support structure are adapted to be joined together solely by moving them along the slide direction, then the first support member portion 10 preferably comprises an insertion guide member 12b that allows for more easily introducing the second support member portion 20 into the groove 35. The insertion guide member 12b is preferably configured to extend at an angle to the slide direction such that it can facilitate the insertion of the second support member portion 20 into the groove 35 defined by the tab 11 of the first support member portion 10 as much as possible.

As can be seen in FIGS. 22-23, the component holes 18 are preferably implemented in the base plate 15 as through holes. As it can also be well observed in FIG. 22, in order to increase the stability of the wall 16, the first support member portion 10 comprises a stiffener member 14b that is adapted for supporting the wall 16 and is arranged between the wall 16 and the slide surface of the sliding edge 17. In addition to stabilising the wall 16, the stiffener members 14b also provide reinforcement to the sliding edge 17 in order to prevent the sliding edge 17 from being deformed even under the load of the mountable component, such that it does not block the movement (sliding) of the second support member portion 20 due to the deformation. In the preferred embodiment according to FIGS. 22, the stiffener members 14b are disposed evenly, i.e., equally spaced apart from each other; however, the stiffener members 14b can also be included in a number and arrangement that are different from what is shown in the figure.

In FIG. 24 the first support member portion 10 can be seen in front view such that the preferred configuration of the groove 35 defined by the tab 11 can be observed even better. Preferably, the dimensions of the groove 35 are selected corresponding to the second support member portion 20 such that the groove 35 is able to receive the edge 34 of the second support member portion 20, and to hold and support the second support member portion 20. The groove 35 must allow the second support member portion 20 to move (slide) in the groove 35. In FIG. 24 it can also be observed that the preferably the wall 16 and the spacer member 19 have an approximately identical height, so in the horizontal position of the support structure according to the invention (depicted also in FIG. 24) the second support member portion 20 can be seated not only on the sliding edge 17 but also on the spacer member 19, thereby ensuring that a spacing is provided between the base plate 15 of the first support member portion 10 and the second support member portion 20, whereby sufficient room is provided for the retainer members adapted for holding the mountable component and for securing the support structure to additional structural components to prevent them from blocking the relative movement (sliding) of the first support member portion 10 and second support member portion 20.

The mode of industrial application of the invention follows from the features of the technical solution according to the disclosure above. As can be seen from the description above, the invention achieves its objectives in an extremely advantageous manner compared to the prior art. The invention is, of course, not limited to the preferred embodiments described in detail above, but further variants, modifications and developments are possible within the scope of protection determined by the claims.

LIST OF REFERENCE SIGNS 10 first support member portion
11 tab
12a guide member
12b insertion guide member
13 securing bore
14a, 14b stiffener members
15 base plate
16 wall
17 sliding edge
18 component hole
19 spacer member
20 second support member portion
21 mounting hole
22 securing-positioning bore
23 cut-out
24a, 24b stiffener members
25 bolt
30a, 30b, 30c, 30d, 30e pump
31a, 31b, 31c, 31d, 31e pump base
32 pump base hole
33 rubber bracket
34 edge
35 groove

The invention claimed is:

1. A support structure comprising
a first support member portion, and
a second support member portion adapted to be fixed to the first support member portion in various relative positions with respect to the first support member portion along a slide direction,
characterised in that
the first support member portion comprises
a base plate,
a sliding edge protruding from the base plate and defining a slide surface, and
a tab arranged spaced apart from the slide surface of the sliding edge, said tab defining a groove adapted for receiving an edge of the second support member portion extending along the slide direction, and
the second support member portion comprises a cut-out on the edge of the second support member portion extending along the slide direction adapted to enable the second support member portion to be placed on the slide surface of the first support member portion, wherein the second support member portion further comprises a spacer member adapted for keeping a distance between the first support member portion and the second support member portion.

2. The support structure according to claim 1, characterised in that the first support member portion comprises a securing bore formed in the sliding edge and the second support member portion comprises a securing-positioning bore, wherein the securing bore and the securing-positioning bore are configured to overlap by sliding the first support member portion and the second support member portion relative to each other in the slide direction, and to enable the first support member portion and the second support member portion to be secured to each other via a retainer member passed through the securing bore and the securing-positioning bore.

3. The support structure according to claim 2, characterised in that the second support member portion comprises a plurality of securing-positioning bores located spaced apart from each other, each of the securing-positioning bores are adapted to be made to overlap with the securing bore formed in the sliding edge by sliding the first support member portion and the second support member portion relative to each other in the slide direction.

4. The support structure according to claim 2, characterised in that the securing-positioning bore is arranged along the edge of the second support member portion extending along the slide direction.

5. The support structure according to claim 1, characterised in that mounting holes adapted for fixing a mountable component are formed on the second support member portion.

6. The support structure according to claim 1, characterised in that the first support member portion and/or the second support member portion comprises a stiffener member.

7. The support structure according to claim 6, characterised in that the stiffener member is a stiffening rib arranged on the first support member portion and/or the second support member portion and extends along and/or transversely to the slide direction.

8. A support structure comprising
a first support member portion, and
a second support member portion adapted to be fixed to the first support member portion in various relative positions with respect to the first support member portion along a slide direction,
characterised in that
the first support member portion comprises a base plate, a sliding edge protruding from the base plate and defining a slide surface, and a tab arranged spaced apart from the slide surface of the sliding edge, said tab defining a groove adapted for receiving an edge of the second support member portion extending along the slide direction, and the second support member portion comprises a cut-out on the edge of the second support member portion extending along the slide direction adapted to enable the second support member portion to be placed on the slide surface of the first support member portion, wherein the first support member portion further comprises a securing bore formed in the sliding edge and the second support member portion comprises a securing-positioning bore, wherein the securing bore and the securing-positioning bore are configured to overlap by sliding the first support member portion and the second support member portion relative to each other in the slide direction, and to enable the first support member portion and the second support member portion to be secured to each other via a retainer member passed through the securing bore and the securing-positioning bore.

* * * * *